US006427021B1

(12) United States Patent
Fischer et al.

(10) Patent No.: US 6,427,021 B1
(45) Date of Patent: Jul. 30, 2002

(54) RECORDING GRAPHICAL AND TRACKING INFORMATION ON THE FACE OF A MAILPIECE

(75) Inventors: Meredith B. Fischer, Norwalk; Ronald P. Sansone, Weston, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/203,463

(22) Filed: Dec. 2, 1998

(51) Int. Cl.[7] .................. G06K 9/00
(52) U.S. Cl. .................. 382/101; 382/100; 705/408
(58) Field of Search .................. 382/101, 100; 209/900, 584; 705/408, 401

(56) References Cited

U.S. PATENT DOCUMENTS

| | | | | |
|---|---|---|---|---|
| 4,831,554 A | | 5/1989 | Storace et al. | 364/519 |
| 5,072,400 A | * | 12/1991 | Manduley | 364/478 |
| 5,343,527 A | | 8/1994 | Moore | 380/4 |
| 5,509,074 A | | 4/1996 | Choudhury et al. | 380/23 |
| 5,530,520 A | | 6/1996 | Clearwater | 355/201 |
| 5,613,004 A | | 3/1997 | Cooperman et al. | 380/28 |
| 5,636,292 A | | 6/1997 | Rhoads | 382/232 |
| 5,638,443 A | | 6/1997 | Stefik et al. | 380/4 |
| 5,646,999 A | | 7/1997 | Saito | 380/25 |
| 5,687,236 A | | 11/1997 | Moskowitz et al. | 380/28 |
| 5,699,427 A | | 12/1997 | Chow et al. | 380/3 |
| 5,710,834 A | | 1/1998 | Rhoads | 382/232 |
| 5,715,403 A | | 2/1998 | Stefik | 395/244 |
| 5,748,763 A | | 5/1998 | Rhoads | 382/115 |
| 5,819,241 A | | 10/1998 | Reiter | 705/408 |
| 5,917,925 A | * | 6/1999 | Moore | 382/101 |
| 5,974,147 A | * | 10/1999 | Cordery et al. | 380/25 |
| 6,108,643 A | * | 8/2000 | Sansone | 705/62 |

FOREIGN PATENT DOCUMENTS

| | | | |
|---|---|---|---|
| EP | 0710930 A2 | 8/1996 | G07B/17/00 |
| EP | 0732673 A2 | 9/1996 | G07B/17/04 |
| WO | WO 97/14117 | 4/1997 | G07B/17/02 |

* cited by examiner

*Primary Examiner*—Leo Boudreau
*Assistant Examiner*—M B Choobin
(74) *Attorney, Agent, or Firm*—Ronald Reichman; Michael E. Melton

(57) ABSTRACT

A method and system that permits artistic works that are accessed on the internet or from a data center to be down loaded pursuant to an agreement with a representative of the copyright owner to users of postal security devices to pay for their use of copyrighted artistic works. A scanner at the post would read the already existing indicia and other information on the mail piece and then extract a unique identifier contained on the mail piece that is associated with the artistic or graphical information contracted to appear on the mail piece. The scanner with also read tracking information that is contained in the unique identifier. The extracted unique identifier would be periodically uploaded to a data center. The data center would compare the unique identifier on the mail piece with information about artistic or graphical information that has previously been uploaded from sending postal security devices to determine when the track mail piece arrived at a post office near the addressee.

6 Claims, 23 Drawing Sheets

RECORDING GRAPHICAL AND TRACKING INFORMATION ON THE FACE OF A MAILPIECE

CROSS REFERENCE TO RELATED APPLICATIONS

Reference is made to commonly assigned co-pending patent application Ser. No. 09/204,219 filed herewith entitled "Digital Printing, Metering and Recording of Graphical Information on The Face of A Mail Piece" in the names of Meredith B. Fischer and Ronald Sansone, Ser. No. 09/204,382 filed herewith entitled "Metering, Recording And Reading Graphical Information On The face Of A Mail Piece To Detect Misuse Of The Graphical Information" in the names of Ronald Sansone and Meredith B. Fischer, and Ser. No. 09/204,380 filed herewith entitled "Recording Graphical Information On The face Of A Mail Piece And Placing Information About The Graphical Information In An Information-Based Indicia" in the names of Ronald Sansone and Meredith B. Fischer.

FIELD OF THE INVENTION

The invention relates generally to the field of postage meters and more particularly to the digital printing of postage indicia and the recording of other information on the face of a mail piece that is subsequently read.

BACKGROUND OF THE INVENTION

Copyrights may be obtained for pictorial and graphic, works of fine, graphic and applied art, photographs, prints, maps, technical drawings and diagrams. Such works must include works of artistic craftsmanship insofar as their form, but not their mechanical or utilitarian aspects, are concerned. An artist obtains copyright protection for their "original works of art" when the works are fixed in a tangible medium. Thus, currently copyright protection is secured automatically upon creation.

In general, in the United States, copyright registration is a legal formality intended to make a public record of the basic fact of a particular copyright. Even though registration is not generally a requirement for copyright protection, the copyright law requires registration before any infringement suit may be filed in court.

Basically, the unauthorized making or publication of a copy of a copyrighted work is the essence of copyright infringement. An unauthorized copy is that which ordinary observation would cause one to be of the opinion that the copy had been taken from the work of another.

Mere similarity alone does not necessarily establish infringement. Fundamentally, a copyright affords protection against copying only. The copyright laws impose no prohibition against the independent creation of a work, even though it may be similar or identical to the copyrighted work. As a consequence, a claim of copyright infringement can be defeated by evidence that the accused work was independently produced.

Notwithstanding the copyright deterrence factor, many people use copyrighted artistic works or incorporate portions of copyrighted artistic works in their own works without receiving permission from the copyright owner. Photocopying machines and the internet have made it easier to copy artist copyrighted works. In fact, the above type of copyright infringement is very pervasive throughout our society.

The music industry has made an effort to protect the rights of music writers through ASCAP, which monitors the playing of music to assure that commercial use of such music is authorized. Copyright Clearing House has a scheme for representing authors and publishers to protect literary works. Each of these schemes involves paying a fixed fee for the right to play the copyrighted music or reproduce copyrighted writings, respectfully. Other than this, there are no organized and effective methods for protecting the rights of artistic copyright owners.

There is also a problem with regard to those who wish to reproduce copyrighted artistic material, but have no convenient means for making payment. One using the internet wishing to reproduce an artistic work would have a near-impossible task trying to obtain consent from the copyright owner, who maybe thousands of miles away. The person wishing to copy the material with consent would not know the cost of producing such material and would not know where to send payment. Clearly, it would be advantageous if a system would be provided whereby the public would have the ability to obtain authorization for reproducing the copyrighted work.

Historically, postage meters have been mechanical and electromechanical devices that: maintain, through mechanical or "electronic registers" (postal security devices), an account of all postage printed and the remaining balance of prepaid postage; and print postage postmarks (indicia) that are accepted by the postal service as evidence of the prepayment of postage. With the introduction of postage meters that print a postal indicia by means of digital printing, it became possible to print artistic copyrighted works in the vicinity of the postal indicia. Users of postage meters also have a problem in reproducing copyrighted artistic works, since no convenient means for making payment to the owner of the copyright currently exists.

Soon, small business mailers may be able to use their desktop computer and printer to apply postage directly onto envelopes or labels while applying an address. The United States Postal Service Engineering Center recently published a notice of proposed specification that may accomplish the foregoing. The title of the specification is Information-Based Indicia Program Postal Security Device Specification, dated Jun. 13, 1996, herein incorporated by reference. The Information-Based Indicia Program specification includes both proposed specifications for the new indicium and proposed specifications for a postal security device (PSD). The proposed Information-Based Indicia (IBI) consists of a two-dimensional bar code containing hundreds of bytes of information about the mail piece and certain human-readable information. The indicium includes a digital signature to preclude the forgery of indicia by unauthorized parties. The postal security device is a security device that produces a cryptographic digital signature for the indicium and performs the function of postage meter registers.

The IBIP is a United States Postal Service initiative supporting the development and implementation of a new form of postal indicia. The IBIP specification is intended to address the counterfeiting threat. An IBIP indicium substitutes for a postage stamp or as a postage meter imprint as evidence of the fact that postage has been paid on mail pieces. The Information-Based Indicia technology of the United States Postal Service offers the postal customer a way to pay for postage without stamps. Envelopes may be franked using the postal customer's personal computer, a personal computer compatible add-on and the customer's printer. The PSD provides postal value storage and the link to the USPS and the manufacturer of the personal computer compatible add-on. The IBI should be able to be read at any time to verify that funds have been paid.

Mailers who would use graphics for advertising usually include in the mailing a reply card or a 800 telephone number to call to order the offered product. Knowledge of the arrival of the mailing allows the mailer to anticipate staffing requirements needed to respond to the influx of orders. Historically, a mailer would hire an outside service provider who would provide a list of agent addresses to send some of the mailings to. The service provider would have its agents notify the service provider upon receipt of the mailing, thereupon the service provider would notify the mailer of the receipt of certain specified mailings. A disadvantage of the above process is that it is costly and imprecise. Another disadvantage of the process is that people who have no intention of buying the product receive mailings. An additional disadvantage of the above process is that a very limited sampling is obtained.

SUMMARY OF THE INVENTION

The present invention overcomes the disadvantages of the prior art by providing an inexpensive method and system that permits artistic works that are accessed on the internet or from a data center to be downloaded pursuant to an agreement with a representative of the copyright owner to users of postal security devices to pay for their use of copyrighted artistic works. A scanner at the post would read the already existing indicia and other information on the mail piece and then extract a unique identifier contained on the mail piece that is associated with the artistic or graphical information contracted to appear on the mail piece. The scanner will also read tracking information that is contained in the unique identifier. The extracted unique identifier would be periodically uploaded to a data center. The data center would compare the unique identifier on the mail piece with information about artistic or graphical information that has previously been uploaded from sending postal security devices to determine if misuse has been committed in the production of the artistic or graphical information.

The invention also counts the number of times given artistic works or graphical information are read by postal scanners. Thus, the data center will be able to determine actual usage of the artistic works or graphical information and compare them with the contracted usage of the artistic works or graphical information. The invention also can process the information read by the postal scanners and determine whether or not the mailer wants a tracking report produced. If tracking has been elected, data is extracted from the data scanned by the postal scanners and a report is generated detailing the arrival time and location of the mailers mail pieces.

DETAILED DESCRIPTION OF THE PREFERRED EMBODIMENTS

Figure 1:
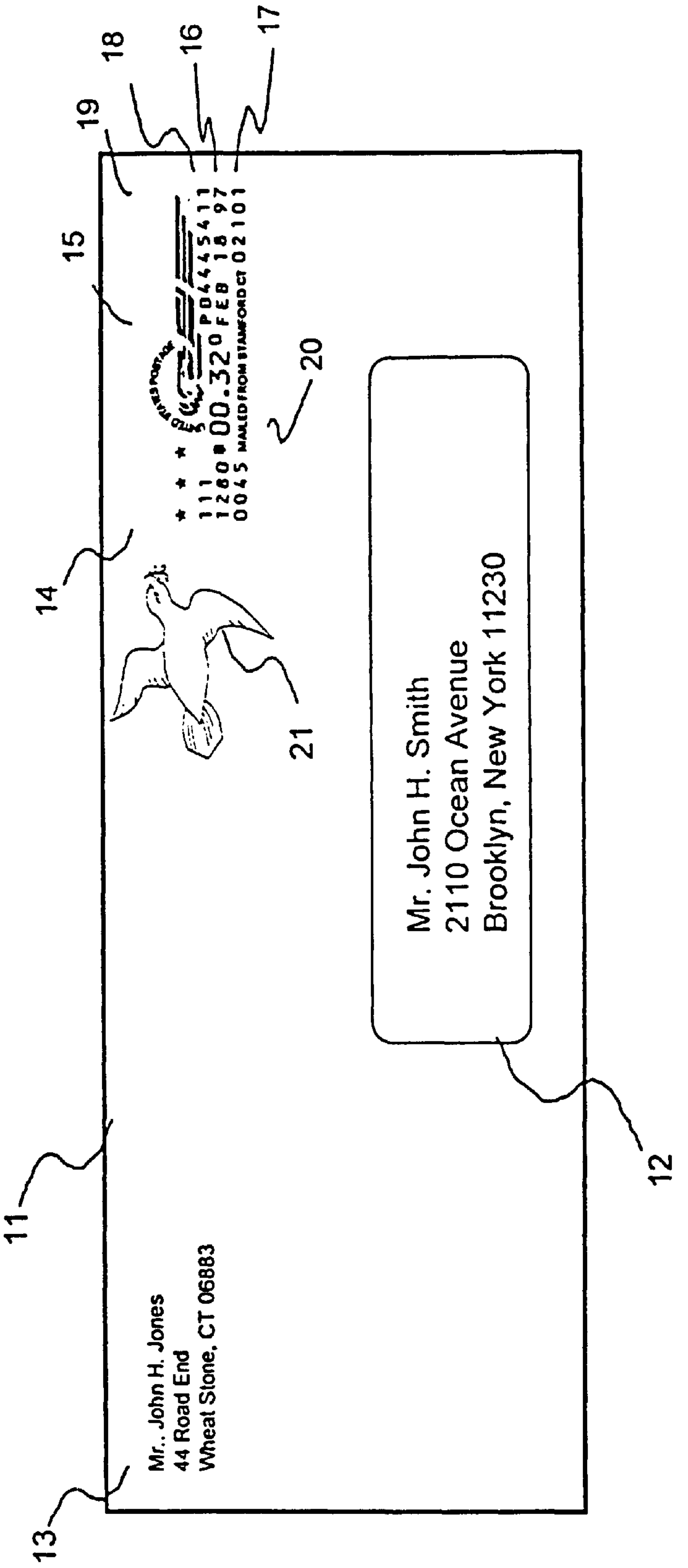
FIGURE 1 PRIOR ART
FIG. 1 is a drawing of a prior art mail piece containing a postal indicia and graphical information.

Referring now to the drawings in detail, and more particularly to FIG. 1, the reference character 11 represents a prior art mail piece that has a recipient address field 12 and a sender address field 13. A postal indicia 14 that was made by a electronic meter is affixed to mail piece 11. Indicia 14 contains a dollar amount 15, the date 16, that postal indicia 14 was affixed to mail piece 11, the place the mail piece was mailed from 17, the postal meter serial number 18 an eagle 19 and a security code 20. Security code 20 is a unique number that is derived from address field 12 and information contained in the postage meter that affixed indicia 14. The manner in which security code 20 is obtained is disclosed in the Sansone et al U.S. Pat. No. 4,831,555 entitled "Unsecured Postage Applying System" herein incorporated by reference. Graphical artistic material or an advertising slogan 21 is also affixed to mail piece 11.

Figure 2:
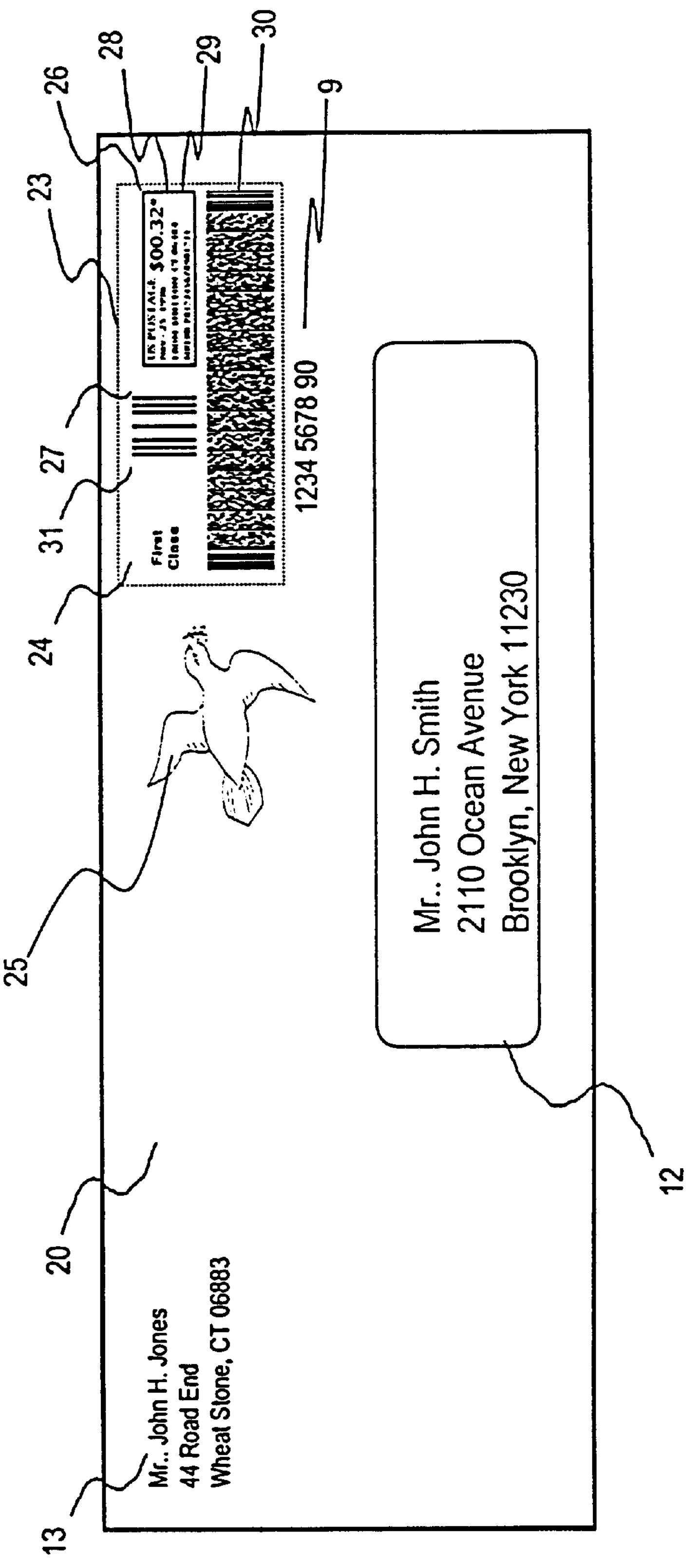
FIGURE 2 PRIOR ART
FIG. 2 is a drawing of a prior art mail piece containing an Information-Based postal Indicia (IBI) and graphical information.

FIG. 2 is a drawing of a prior art mail piece containing a USPS Information-Based Indicia (IBI) 24 and graphical information or advertising information 25 that was affixed by a electronic meter or a printer that was coupled to a postal security device. Mail piece 11 has a recipient address field 12 and a sender address field 13. Indicia 24 contains a dollar amount 26, the date 27 that postal indicia 24 was affixed to mail piece 11, the place 28 that mail piece 11 was mailed, the postal meter serial number 29, a two-dimensional encrypted bar code 30, a Facing Identification Mark (FIM) 31 and a security code 9. Security code 9 may be contained within code 30. The manner in which security code 9 is obtained is disclosed in the Sansone et al U.S. Pat. No. 4,831,555 entitled "Unsecured Postage Applying System" herein incorporated by reference.

Figure 3:
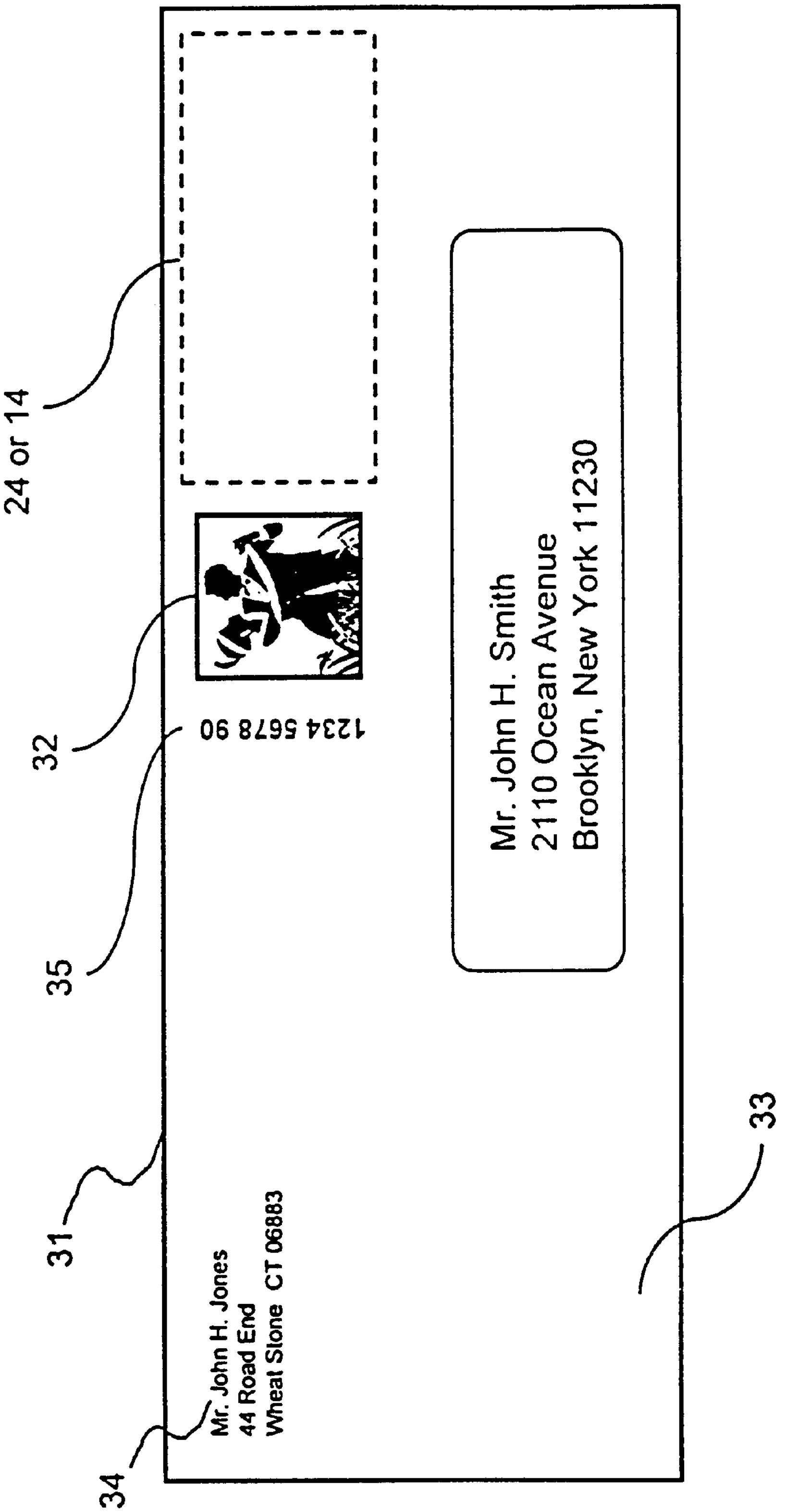
FIG. 3 is a drawing of a artistic mail piece containing a postal indicia and graphical information that was down loaded pursuant to an agreement with a representative of the copyright owner.

FIG. 3 is a drawing of an artistic mail piece 31 containing a postal indicia 14 or 24 and graphical information 32 that was down loaded pursuant to an agreement with a representative of the copyright owner. Mail piece 31 has a recipient address field 33 and a sender address field 34. A postal indicia 14 or 24 is affixed to mail piece 31. Graphical information 32 contains a coded number embedded in the graphical information 32 or a security code or encrypted number 35 that is printed in the vicinity of the graphical information 32. It will be obvious to one skilled in the art that graphical information 32 may be placed at other locations on mail piece 31 and/or additional graphical information may be placed on mail piece 31. The manner in which encrypted number 35 will be generated will be more fully described in the description of FIG. 11.

Figure 4:
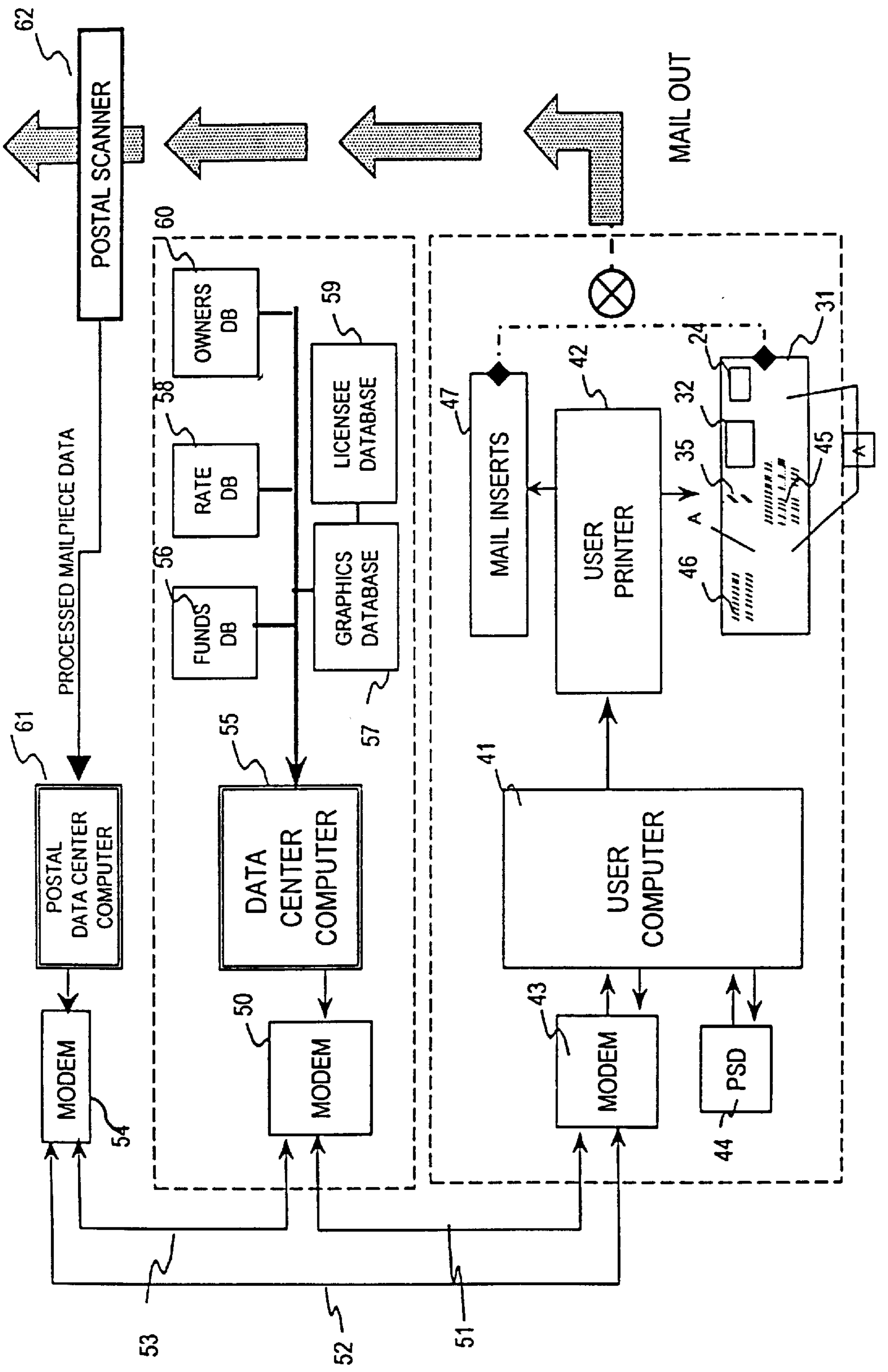
FIG. 4 is a block diagram of a personal computer 41, a postal security device 44 and a printer 42 that is used to place graphical information 32 on mail piece 31.

FIG. 4 is a block diagram of a personal computer 41, a postal security device 44 and a printer 42 that is used to place graphical information 32 on mail piece 31. Computer 41 is coupled to printer 42, modem 43 and postal security device 44. Postal security device (PSD) 44 is specified in the Information-Based Indicia Program Postal Security Device Specification, dated Jun. 13, 1996, herein incorporated by reference. PSD 44 is expected to be a hardware component for use with a computer based mail metering system. PSD 44 will be a unique security device. The core security functions of PSD 44 are cryptographic digital signature generation and verification and secure management of the registers that track the remaining amount of money available for indicia creation, i.e., descending register and the total postage value used by PSD 44, i.e., ascending register. PSD 44 will be a tamper-resistant device that may contain an internal random number generator, various storage registers, a date/time clock and other circuits necessary to perform the foregoing functions. PSD 44 will comply with Federal Information Processing Standard (FIPS) 140-1 published by the United States Department Of Commerce, National Bureau of Standards, and will be validated through the National Institute of Standards (NIST) Computer Systems Laboratory's Cryptographic Module Validation Program.

Computer 41 tells printer 42 when and how to print: address field 45, return address field 46, IBI indicia 24, encrypted number 35 and graphical information 32 on mail piece 31. Printer 42 is used to print and complete material 47 that may be inserted into mail piece 31. It would be obvious to one skilled in the art that graphical information 32 may be placed at different locations on mail piece 31, for instance, location A.

Modem 43 is coupled to data center modem 50 via communications path 51 and modem 43 is coupled to postal modem 54 via communications path 52. Modem 50 is coupled to data center computer 55. Data center computer 55 is coupled to: a funds data base 56; a graphics data base 57 and a licensee rate data base 58. Data base 57 contains licensable advertising slogans and/or graphical information 32 that may be placed on mail piece 31 in the spaces reserved for advertising slogans and/or graphical information. Artists and/or the owners of the material contained in data base 57 have previously granted the operator of data center computer 55 the right to license the material contained in data base 57. Licensee data base 59 contains a list of the people or legal entities that contracted to use the graphics and/or other information contained in data base 57. Owners data base 60 contains a list of the artists and/or owners of the material contained in data base 57. Data base 59 is coupled to data base 57 and data base 60 is coupled to data base 57. Licensee rate data base 58 contains the royalty rate for using the material contained in data base 57 and licensee data base 59 contains a list of the people or entities that have contracted for the material contained in data base 57. Computer 55 is also used to control data flow between computer 55 and computer 41.

Modem 54 is coupled to postal data computer 61. Modem 54 is coupled to modems 50 and 43. Postal data center computer 61 is coupled to scanner 62.

The owner or user of computer 41 may contact the operator of data center computer 55 to determine what material, i.e., graphical information and other information, the operator of computer 55 is willing to sublicense for inclusion on mail piece 31 and the material 46 inserted into mail piece 31. If the owner or user of computer 41 elects to license certain specified material in data base 57 at the rate specified in licensee rate data base 58, that licensee is entered in data base 59 and the operator of data center computer 55 pays a previously agreed upon fee to the owner specified in data base 60. The amount agreed upon by the operator of data center computer 55 and computer 41 for each use of the material specified in data base 57 is deducted from that portion of funds data base 56 that the operator of computer 41 has paid for.

After address field 45, return address field 46, IBI indicia 24, graphical information 32, and a security code or encrypted number 35 are printed on mail piece 31 and the proper material is inserted into mail piece 31, mail piece 31 is posted. Postal scanner 62 will scan and read indicia 24 and encrypted number 35. The encrypted number 35 will be forwarded to data center computer 55 via computer 61, over modems 54 and 50. If encrypted number 35 is a valid security code and has been read a specified number of times, computer 55 will inform computer 41 that there has been usage of graphical information 32. Computer 55 will also remove funds from data base 56 and transfer them to owners data base 60. If the encrypted number 35 is an invalid security code and has been read a specified number of times, computer 55 will check other information on suspected mail piece 31 to ascertain if the licensee is the source of the mail piece 31 or if graphical information 32 has been copied by another mailer. For the former case, computer 55 will notify computer 41 that they may have exceeded the amount of usage of graphical information 32 specified in the license agreement. For the latter case, computer 55 will notify the owner of graphical information 32 of the multiple occurrences of unlicensed usage of graphical information 32.

Figure 5:
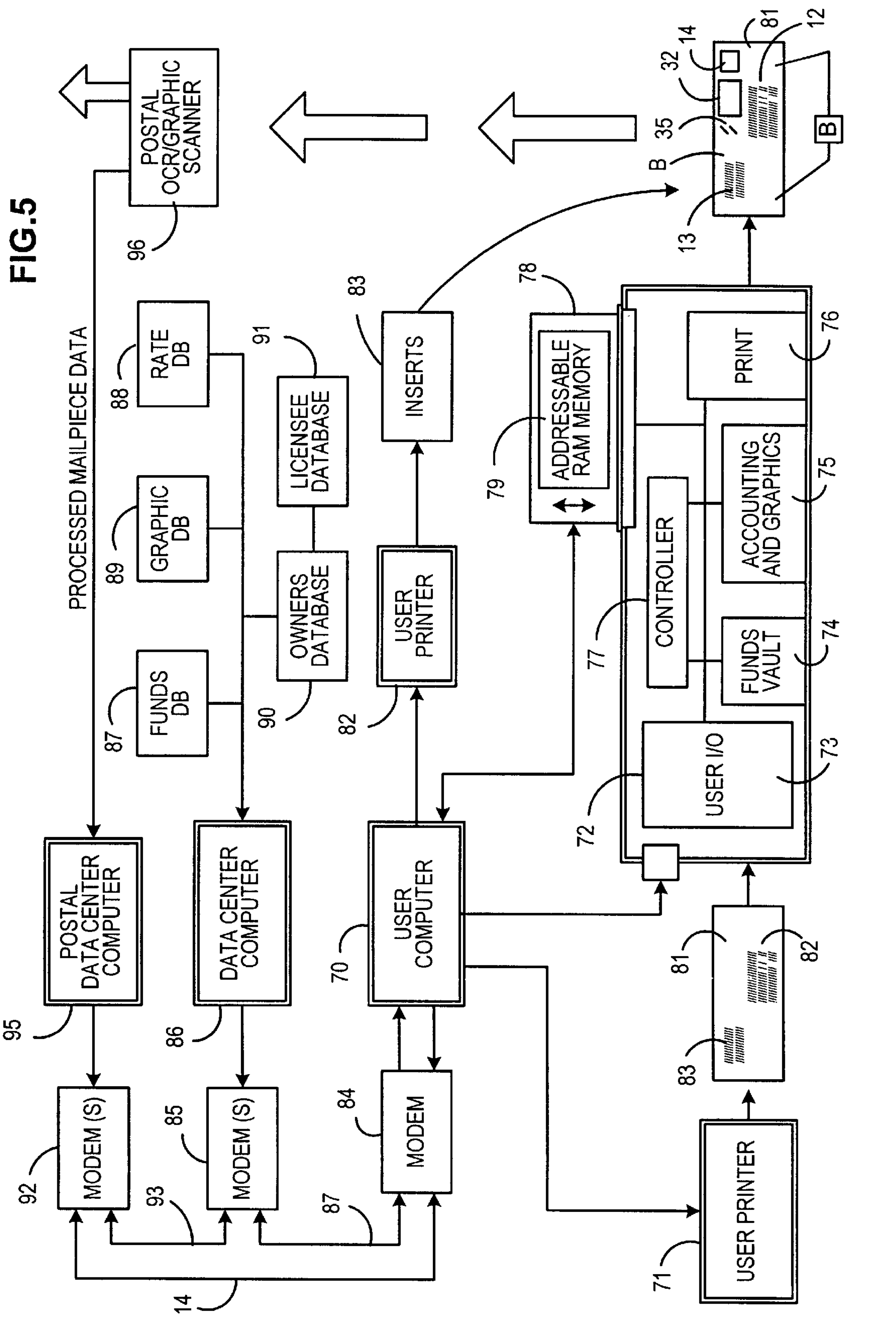
FIG. 5 is a block diagram of a mailer's personal computer 70 and a postage meter 72.

FIG. 5 is a block diagram of a mailer's personal computer 70 and a postage meter 72. A mailer's personal computer 70 is connected to printer 71. Printer 71 is controlled by a mail program which is contained in computer 70 and is more fully described in the description of FIG. 7. Printer 71 prints recipient address field 82 and sender address field 83 on envelope 81.

Computer 70 is connected to digital postage meter 72. Postage meter 72 comprises: a user input/output device 73 that receives mail piece 81; a funds vault 74 that represents the value of the postage that may be used by meter 72, vault 74 is coupled to device 73; an accounting and graphics module 75 that contains information used to print indicia 14, graphical information 32 and security code 35, module 75 is coupled to device 73; a printer 76 that is coupled to device 73; a removable random access memory card 78, card 78 is coupled to device 73; a controller 77 that is coupled to device 73, funds vault 74, accounting and graphics module 75, printer 76, removable random access memory image card 78, and an addressable ram memory 79 contained within card 78. It would be obvious to one skilled in the art that random access memory card 78 may be attached to computer 70 and to controller 77. Printer 76 prints indicia 14, graphical information 32, security code 35 on mail piece 81.

Computer 70 is coupled to removable random access memory card 78. Computer 70 is also coupled to user printer 82. Printer 82 is used to print material 83 that may be inserted into mail piece 81. It would be obvious to one skilled in the art that graphical information 32 may be placed at different locations on mail piece 81, for instance, location B.

Computer 70 is coupled to postage meter data center 86 via modem 84, communications path 87 and modem 85. Postage meter data center computer 86 is coupled to: modem 85; a funds data base 87; a graphics data base 89; wherein data base 89 contains licensable graphical material and licensable slogans that may be placed on mail piece 81, and a rate data base 88 that specifies the rate for licensing the material contained in data base 89. Computer 86 is also coupled to owners data base 90 and licensee data base 91. Computer 86 is used to control data flow between computer 70 and computer 86.

Artists and/or the owners of the material contained in data base 89 have previously granted the operator of data center computer 86 the right to license the material contained in data base 89. Licensee data base 91 contains a list of the people or legal entities that contracted to use the graphics and/or other information contained in data base 89. Owners data base 90 contains a list of the artists and/or owners of the material contained in data base 89. Licensee rate data base 88 contains the royalty rate for using the material contained in data base 89.

Modem 92 is coupled to modem 85 via communications path 93 and modem 92 is coupled to modem 84 via communications path 94. Postal center computer 95 is coupled to postal scanner 96.

The owner or user of computer 70 may contact the operator of data center computer 86 to determine what material, i.e., graphical information and other information the operator of computer 86 is willing to sublicense for inclusion on mail piece 81 and the material inserted into mail piece 81. If the owner or user of computer 70 elects to license certain specified material in data base 89 at the rate specified in licensee rate data base 88, that licensee is entered in data base 91 and the operator of data center computer 86 pays a previously agreed upon fee to the owner specified in data base 60. The amount agreed upon by the operator of data center computer 86 and computer 70 for each use of the material specified in data base 89 is deducted from that portion of funds data base 87 that the operator of computer 70 has paid for.

After indicia 14, graphical information 32, and encrypted number 35 are printed on mail piece 81 and the proper material is inserted into mail piece 31, mail piece 31 is posted. Postal scanner 96 will scan and read indicia 14 and encrypted number 35. The encrypted number 35 will be forwarded to data center computer 86 via computer 95, over modems 92 and 85. If encrypted number 35 is a valid security code and has been read a specified number of times, computer 86 will inform computer 70 that there has been usage of graphical information 32. Computer 86 will also remove funds from data base 87 and transfer them to owners data base 90. If the encrypted number 35 is an invalid security code and has been read a specified number of times, computer 86 will check other information on suspected mail piece 81 to ascertain if the licensee is the source of the mail piece 81 or if graphical information 32 has been copied by another mailer. For the former case, computer 86 will notify computer 70 that they may have exceeded the amount of usage of graphical information 32 specified in the license agreement. For the latter case, computer 86 will notify the owner of graphical information 32 of the multiple occurrences of unlicensed usage of graphical information 32.

Figure 6A:
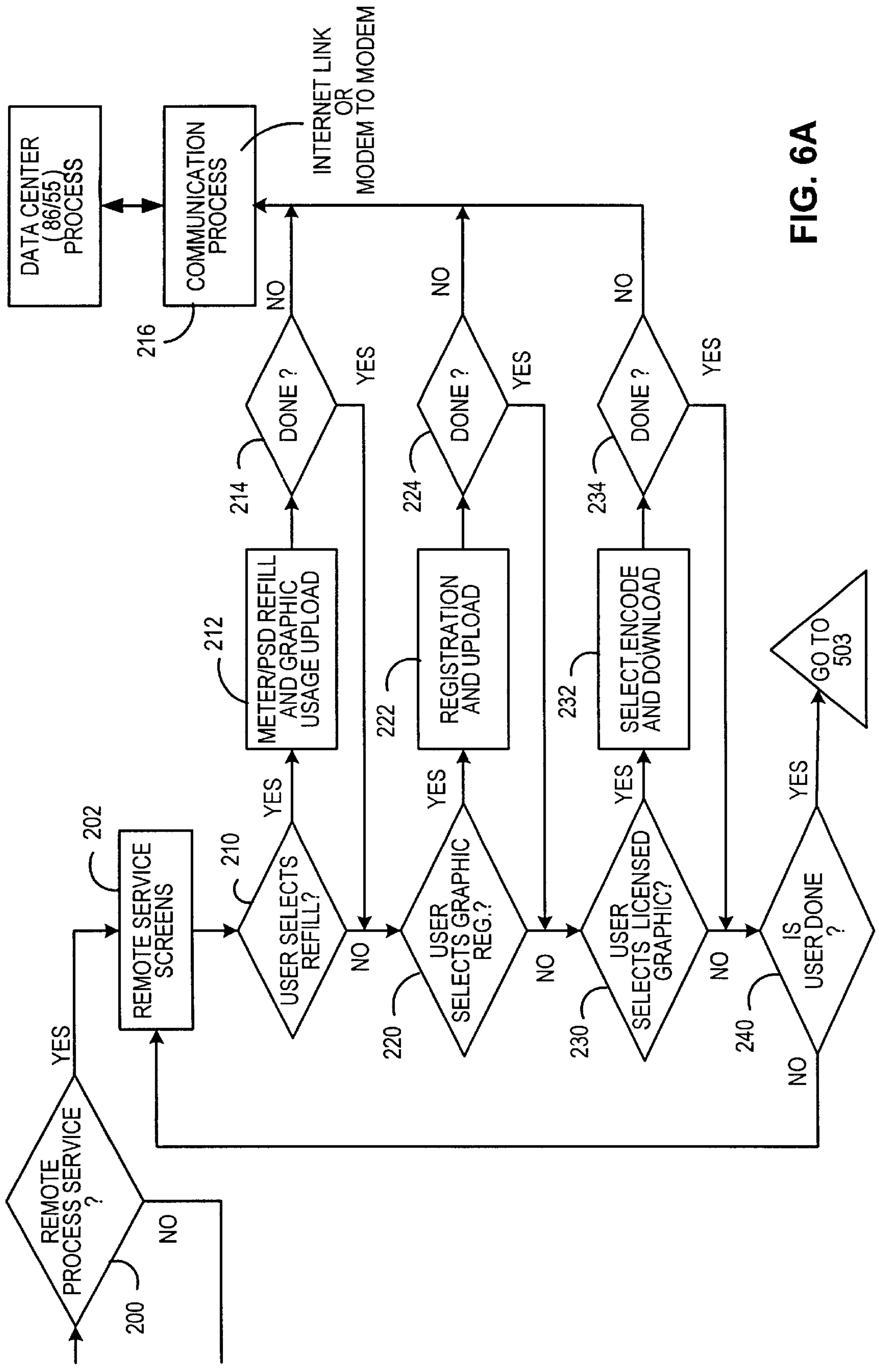
FIG. 6A is a flow chart showing how computer 41 and computer 70 communicate with data centers 55 and 86.

FIG. 6A is a flow chart showing how computer 41 and computer 70 communicate with data centers 55 and 86. This program is stored in computers 41 and 70. The program begins in decision block 200. Block 200 determines if remote process services have been requested. If remote process services have been requested, the program goes to block 202 the remote service screens.

Then the program goes to decision block 210. Block 210 determines whether or not the user has selected a meter or PSD refill or usage of graphic information 32. If the user has selected a meter or PSD refill or usage of graphic information 32, the program goes to block 212 to refill meter 72 or PSD 44 or report the usage of graphic information 32. Now the program goes to decision block 214. Block 214 determines whether or not meter 72 or PSD 44 has been refilled. If meter 72 or PSD 44 has not been refilled, the program goes to block to 216 communication process. The above fact is transmitted to data center 86 or data center 55. If block 214 determines that meter 72 or PSD 44 has been refilled, the program goes to decision block 220.

The program will also go to block 220 if decision block 210 determines that the user did not select a meter or PSD refill. Block 220 determines whether or not the user has selected to register graphical information. If the user has selected to register graphical information, the program goes to block 222 to upload the graphical information. Now the program goes to decision block 224. Block 224 determines whether or not graphical information has been uploaded. If graphical information has not been uploaded, the program goes to block 216 communication process. The above fact is transmitted to data center 86 or data center 55 via modems or the internet. If block 224 determines that graphic information has been uploaded, the program goes to decision block 230.

The program will also go to block 230 if decision block 220 determines that the user did not select to register graphical information. Block 230 determines whether or not the user has selected a graphics license. If the user has selected a graphics license, the program goes to block 232 to select, encode and download. Now the program goes to decision block 234. Block 234 determines whether or not the above process has been completed. If the process has not been completed, the program goes to block to 216 communication process. The above fact is transmitted to data center 86 or data center 55. If block 234 determines that the process has been completed, the program goes to decision block 240.

The program will also go to block 240 if decision block 230 determines that the user did not select a graphics license.

Block 240 determines whether or not the user is done. If the user is done, the program goes to block 503 (FIG. 7). If the user is not done, the program goes back to the input of block 202.

Figure 6B:
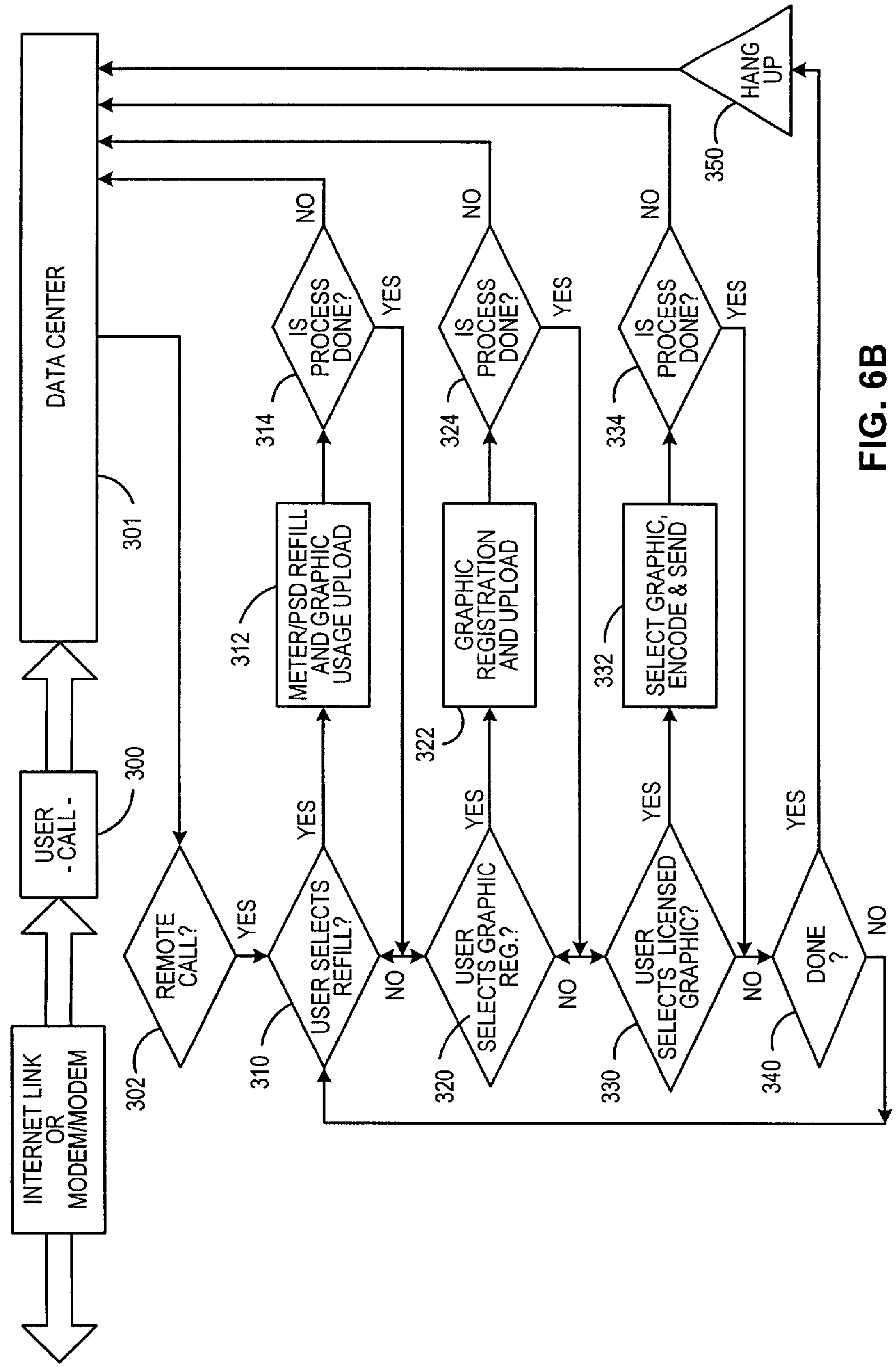
FIG. 6B is a flow chart showing how data centers 86 and 55 communicate with computers 70 and 41.
Figure 7A:
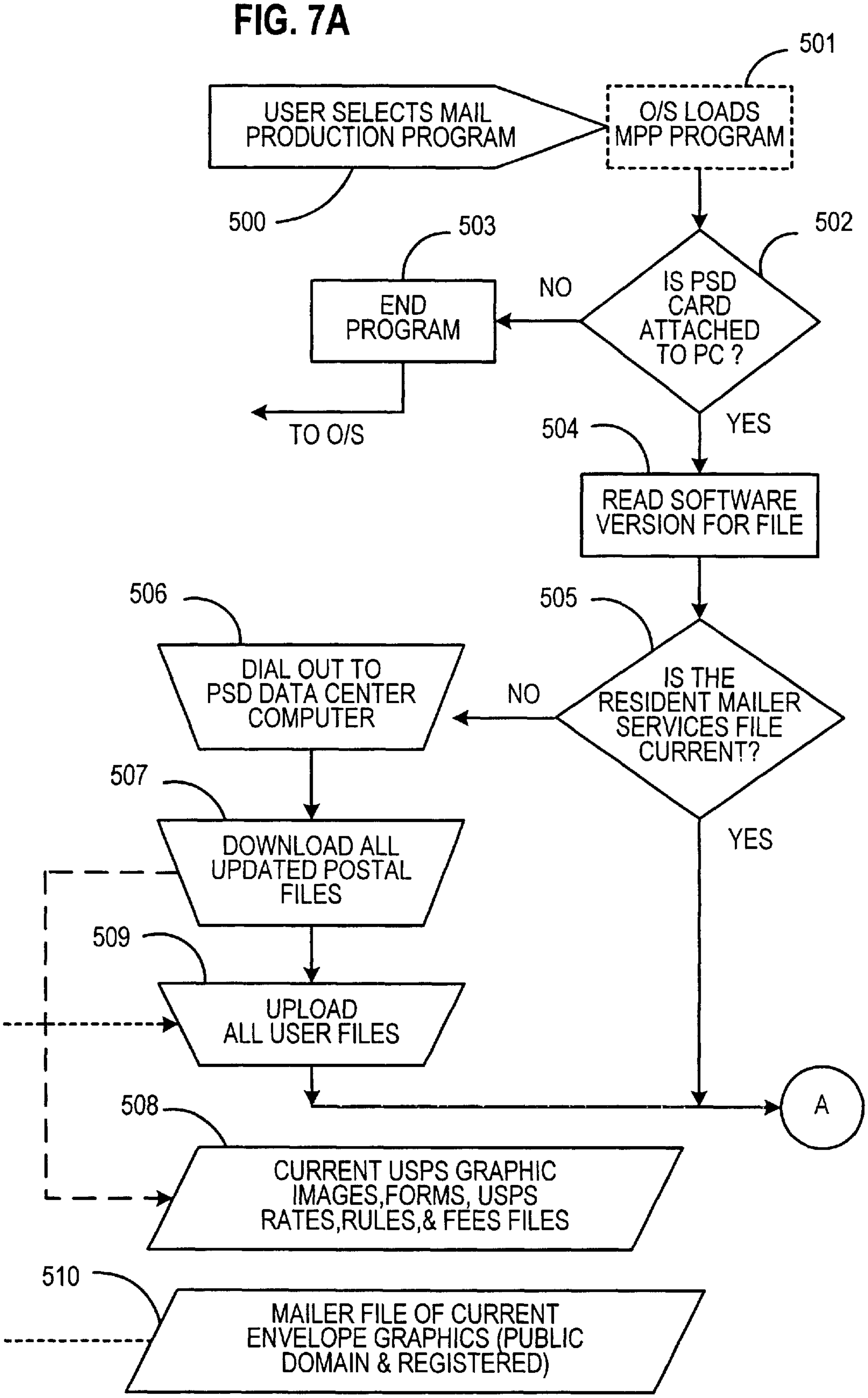
FIGS. 7A–7D is a flow chart of the Mail Production program contained within computer 41 of FIG. 4 and computer 70 of FIG. 5.
Figure 7B:
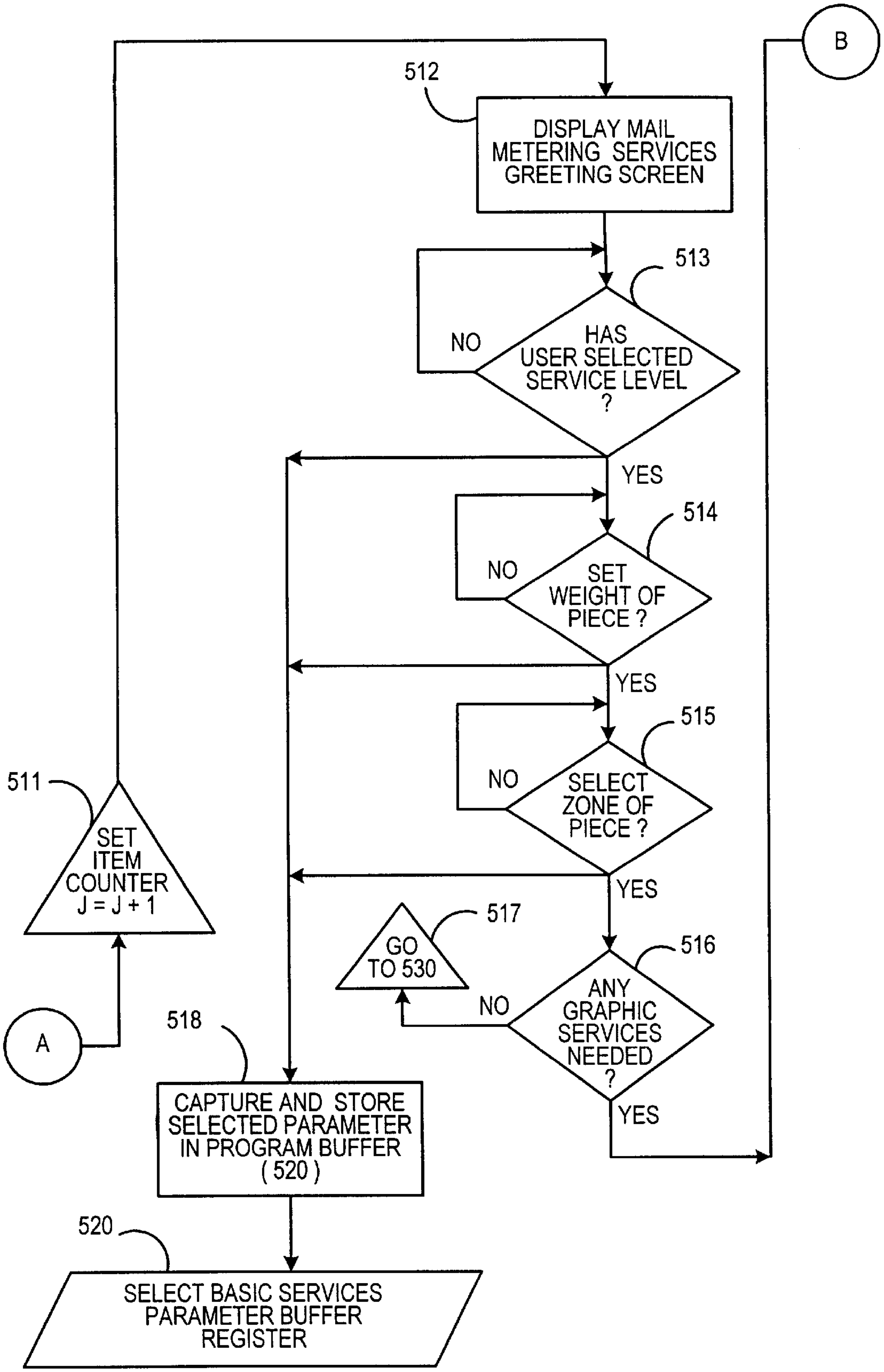
Figure 7C:
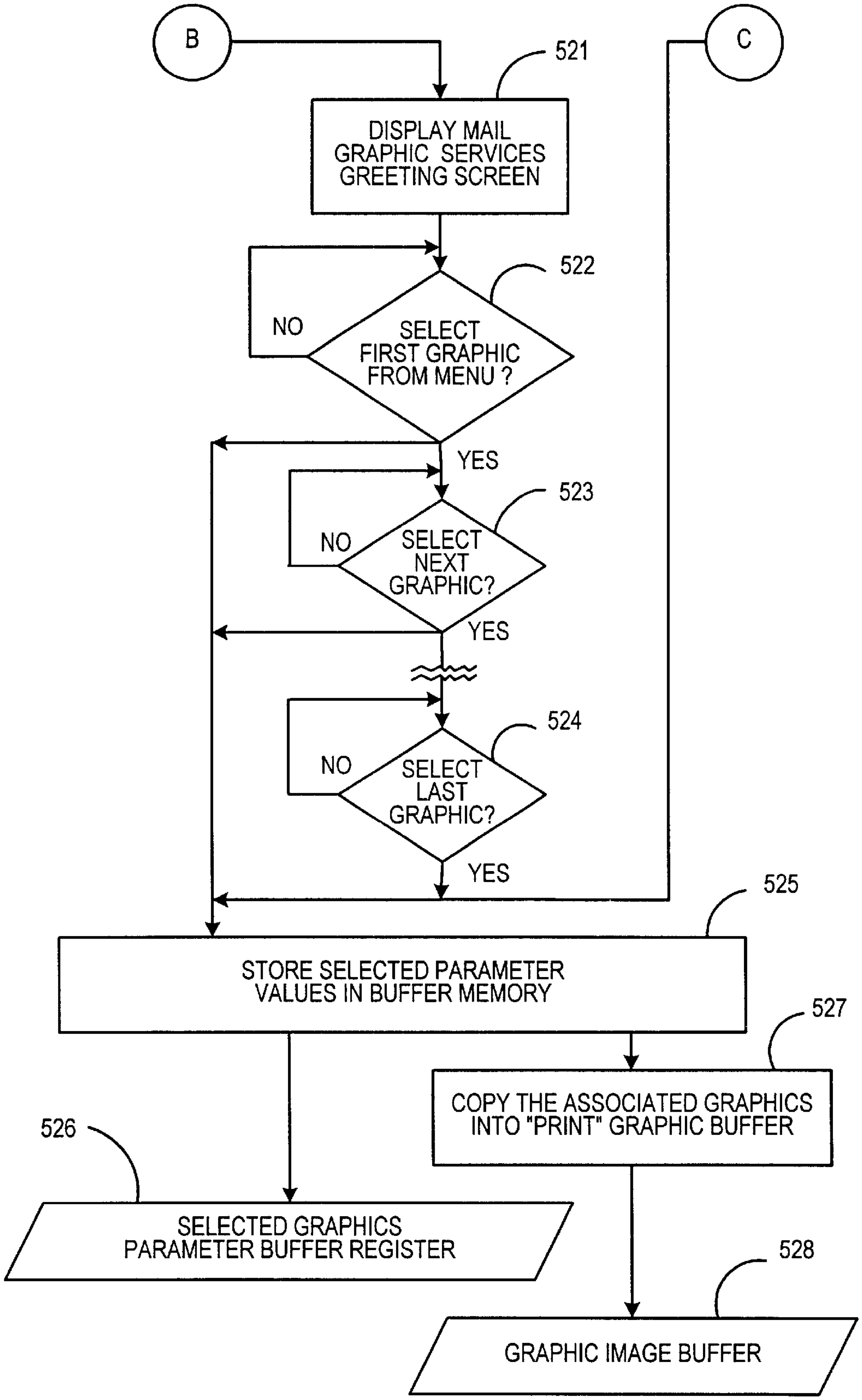
Figure 7D:
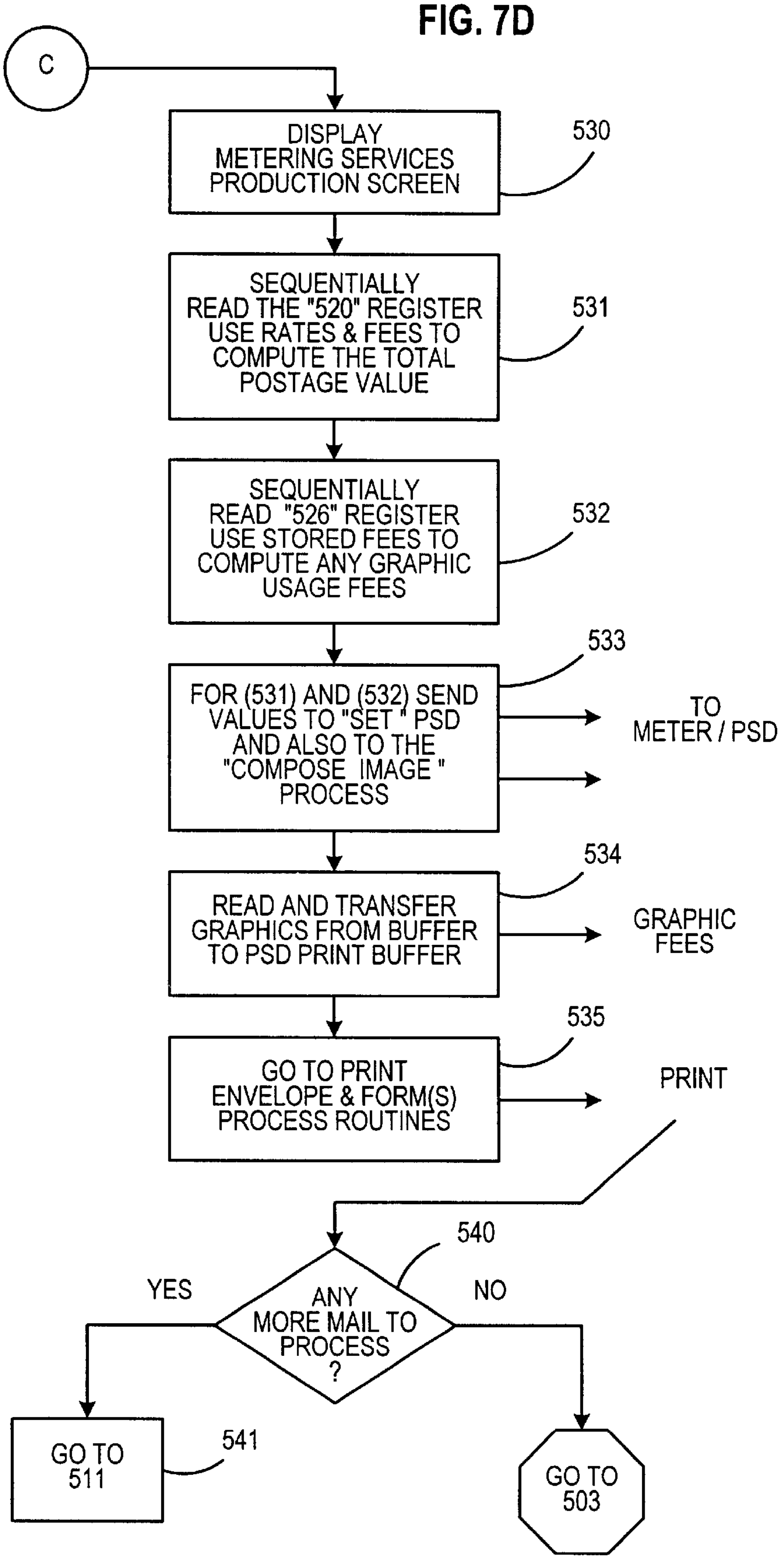

FIG. 6B is a flow chart showing how data centers 86 and 55 communicate with computers 70 and 41. The program begins in block 300 when computer 41 or computer 70 calls data center computer 55 or data center computer 86. This may be done by modem to modem links or via the internet. Now the program goes to block 301 to begin the data center communication process. Then the program goes to decision block 302. Decision block 302 determines whether or not a remote service call was requested. If block 302 determines that a remote call was not requested, the program goes back to block 301. If block 302 determines that a remote service call was requested, the program goes to block 310.

Block 310 determines whether or not the user of computer 41 or computer 70 has selected a meter or PSD refill or usage of graphic information 32. If the user of computer 41 or computer 70 has selected a meter or PSD refill or usage of graphic information 32, the program goes to block 312 to perform the meter, PSD refill routines and/or report usage of graphic information 32. Then the program goes to decision block 314. Decision block 314 determines whether or not this process has been completed. If block 314 determines the process has not been completed, then the program goes to block 301. If block 314 determines that the process has been completed, then the program goes to decision block 320.

If decision block 310 determines that the user of computer 41 or computer 70 did not decide to refill meter 72 or PSD 44, the program also goes to decision block 320. Decision block 320 determines whether or not the user of computer 41 or 70 has selected graphics registration. If block 320 determines that the user of computer 41 or computer 70 has selected graphics registration, the program goes to block 322. Block 322 performs the graphics registration and upload process. Then the program goes to block 324. Block 324 determines whether or not the process has been completed. If block 324 determines that the process has not been completed, then the program goes to block 301. If block 324 determines that the process has been completed, then the program goes to decision block 330.

If decision block 320 determines that the user of computer 41 or 70 did not decide to select graphics registration, the program also goes to decision block 330. Decision block 330 determines whether or not the user of computer 41 or 70 has licensed any graphics. If block 330 determines that the user of computer 41 or computer 70 has licensed graphic information, the program goes to block 332. Block 332 selects, encodes and sends the appropriate files. The encoding may be a serial string of alphanumeric characters that are printed on the mail piece or symbols that are printed on the mail piece. The encoding may also be embedded in the graphic information. Then the program goes to decision block 334. Block 334 determines whether or not the process has been completed. If block 334 determines that the process has not been completed, then the program goes to block 301. If block 334 determines that the process has been completed, the program goes to decision block 340.

If decision block 330 determines that the user of computer 41 or 70 did not decide to license graphic information, the program also goes to decision block 340. Decision block 340 determines whether or not the user is done. If block 340 determines that the user is not done, the program goes back to the input of block 310. If block 340 determines that the user is done, the program goes to block 350 and hangs up.

FIGS. 7A–7D is a flow chart of the Mail Production program contained within computer 41 of FIG. 4 and computer 70 of FIG. 5. The program begins in block 500 where the user selects the mail production program. Then the operating system of computer 50 or computer 70 loads the mail production program in block 501. At this point the program proceeds to decision block 502 to determine whether or not ram card 78 (FIG. 5) is attached to meter 72 or whether or not PSD 44 is attached to computer 41. If ram card 78 is not attached to meter 72 or PSD 44 is not attached to computer 41, then the program goes to block 503 and ends the program. This information is sent back to the operating system of computer 70. If PSD 44 is attached to computer 41 or PSD 44 is attached to meter 72, then the program proceeds to block 504 to read the software version for file. At this point. the program goes to decision block 505 to determine whether or not the resident mailer service file is current. If block 505 determines that the resident mailer service file is not current, then the program goes to block 506 to dial out to data center computer 86 (FIG. 5). Now the program goes to block 507 to download all the updated postal files. This is accomplished by obtaining from block 508 the current postal service graphic images, forms, rates, rules and fee files. Now the program goes to block 509 to upload all user files. The user files are obtained from block 510, the files are the user mailer file of current mail piece graphics (public domain and registered). If decision block 505 determines that the resident mailer service file is current, then the program proceeds to block 511 to set item counter J=1. The program will also proceed to block 511 after uploading all the user files from block 509.

At this point, the program proceeds to block 512 to display the mail metering services greetings on the display of computer 70. Then the program proceeds to decision block 513 to determine whether or not the user has selected one of the offered services, i.e., first class mail, second class mail, third class mail, etc. If the user has not selected a service level, then the program goes back to the input of block 513. If the user has selected a service level, then the program proceeds to block 518 to capture and store the selected parameter in program "B buffer". The program will also go to decision block 514 to determine whether or not the weight of the mail piece was set. If the weight of the mail piece was not set, then the program proceeds back to the input of block 514. If block 514 determines that the weight of the mail piece was set, then the program goes to block 118 to capture and store the selected weight in program "B buffer" the program also goes to decision block 515. Decision block 515 determines whether or not a postal zone for the mail piece has been selected. If the zone has not been selected, then the program goes back to the input of block 515. If the zone has been selected, then the program goes to block 518 to capture and store the selected zone parameter in program "B buffer" and to the input of decision block 516. Decision block 516 determines whether or not any graphic services are needed. If no graphic services are needed, then the program goes to block 517 and then to block 530 to display the metering services production screen on the display of computer 70. If block 516 determines that graphic services are needed, then the program goes to block 521 to display the graphic services on the greeting screen of the display of computer 41, 70. The stored parameters in block 518 are transmitted to block 520 to select the basic services parameter buffer register.

At this point the program proceeds to decision block 522 to determine whether or not the graphic service has been selected from the menu on the screen of computer 41, 70. If decision block 522 determines that the graphic listed in the menu was not selected, then the program goes back to the input of decision block 522. If decision block 522 determines that the graphic on the menu was selected, then the program proceeds to block 525 to store the selected parameter value in buffer memory. Then the program goes to block 526 to select the graphic parameter buffer register. The program will also proceed to the input of decision block 523. Block 523 determines whether or not the second graphic was selected. If the second graphic was not selected, then the program proceeds back to the input of block 523. If the second service special service was selected, then the program goes to block 525 to store the selected parameter value in the buffer memory and to block 526 to select the second graphic parameter buffer register. The program will proceed through a decision block for all of the graphics that were offered (not shown). At this point, the program will proceed to decision block 524. Block 524 determines whether or not the last graphic listed in the menu has been selected. If block 524 determines that the last service on the list has not been selected, then the program goes back to the input of block 524. If block 524 determines that the last graphic has been selected, then the program goes to block 525.

When the program finishes block 525, it goes to blocks 526 and 527 to store the selected parameter values in buffer memory blocks 525 and to copy the associated graphics into the special graphics buffer block 527. Then the program goes to block 528, special graphics image buffer. These function will be at the outputs of blocks 522, 523, and 524. If block 524 determines that the last graphic has been selected, then the program goes to store the selected parameter value in buffer memory in block 525 to copy the associated graphics into graphic buffer in block 527 and to the graphic image buffer in block 528. The program will then go to block 526 to select the graphic parameter buffer register. The program will then go to block 530 to display metering services on the production screen of computer 70. Then the program proceeds to block 531 to sequentially read the information contained in block 520, namely, the selected basic services parameter buffer register, use rates and fees to compose the basic postage value. Now the program goes to block 532 to compute graphic usage fees. Then, the program goes to block 533 to sum block 531 and block 532 to set both the PSD and the composed image charges. Block 533 will also compose the image and transfer this to PSD44/meter 72.

Then the program goes to block 534 to read and transfer service graphics from the buffer to meter ram card 58 or PSD 44. The above information is sent to ram card 78 that is plugged into meter 72, i.e., it transfers the meter card routine. The above information may also be transferred to graphics buffer 98 in PSD 44. The program also goes to block 535 to print the mail piece. Then the program goes to block 800 (FIG. 8) and process the mail piece and returns to block 540 (FIG. 7). Decision block 540 determines whether or not any additional mail is to be processed. If additional mail is to be processed, then the program goes to block 541 and then the program goes to block 511. If decision block 540 determines that there are no more mail pieces to process, then the program goes to decision block 542. Decision block 542 determines whether or not any other process services are requested. If block 542 determines that no other process services are requested, then the program goes to block 543. Then the program proceeds to block 503 to end the program. If block 542 determines that there are other process services that were requested, then the program proceeds to block 543 and ends.

Figure 8:
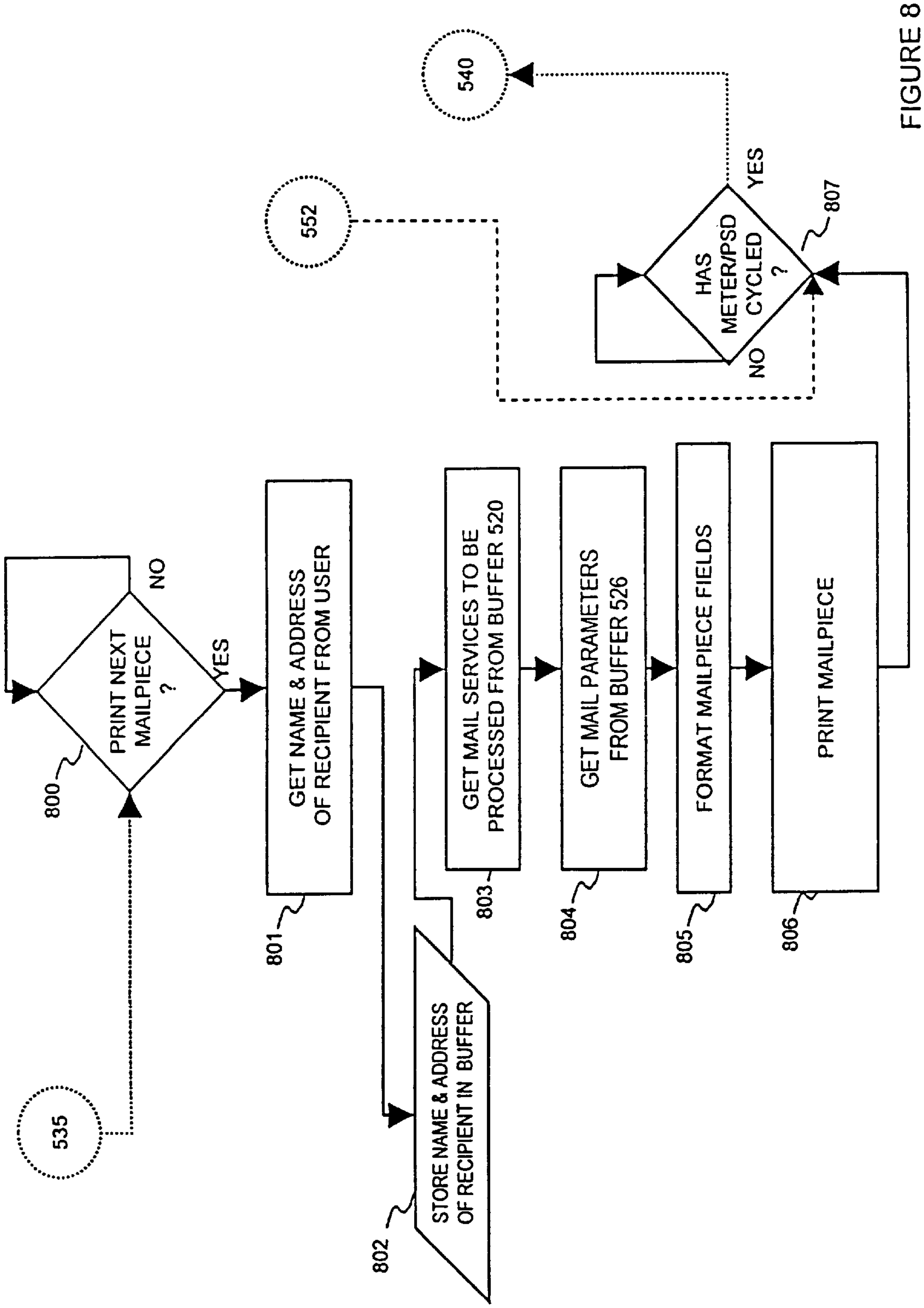
FIG. 8 is a flow chart of a program contained in computers 41 and 70 enabling printers 42, 71 and 76 to print mail pieces 31 and 81.

FIG. 8 is a flow chart of a program contained in computers 41 and 70 enabling printers 42, 71 and 76 to print mail pieces 31 and 81. This program begins in block 535 to print the mail pieces 31 and 81. Then the program goes to decision block 800. Decision block 800 determines whether or not to compose the next envelope. If the program is not ready to compose the next envelope or mail piece, then the program proceeds back to the input of decision block 800. If the program is ready to print the next envelope or mail piece, then the program proceeds to block 801 to get the name and the address of the recipient from the user. Then the program goes to block 802 to store the name and address of the recipient in the buffer. Now the program goes to block 803 to obtain the mail services to be processed from buffer 520. Then the program goes to block 804 to get the mail piece parameters from buffer 526. At this point, the program goes to block 805 to format the envelope field. Then the program goes to block 806 to print the envelope. Now, the program goes to decision block 807. Decision block 807 determines whether or not PSD 44 or meter 72 has finished its printing cycle. If block 807 determines that PSD 44 or meter 72 has not finished its printing cycle, the program goes back to the input of block 807. If block 807 determines that PSD 44 or meter 72 has finished its printing cycle, the program goes to decision block 540 (FIG. 7). Decision block 540 determines whether or not to print another mail piece. If block 540 determines not to print another mail piece, the program goes to block 503 end program (FIG. 7). If block 549 decides to print another mail piece, the program goes back to the input of block 511.

Figure 9:
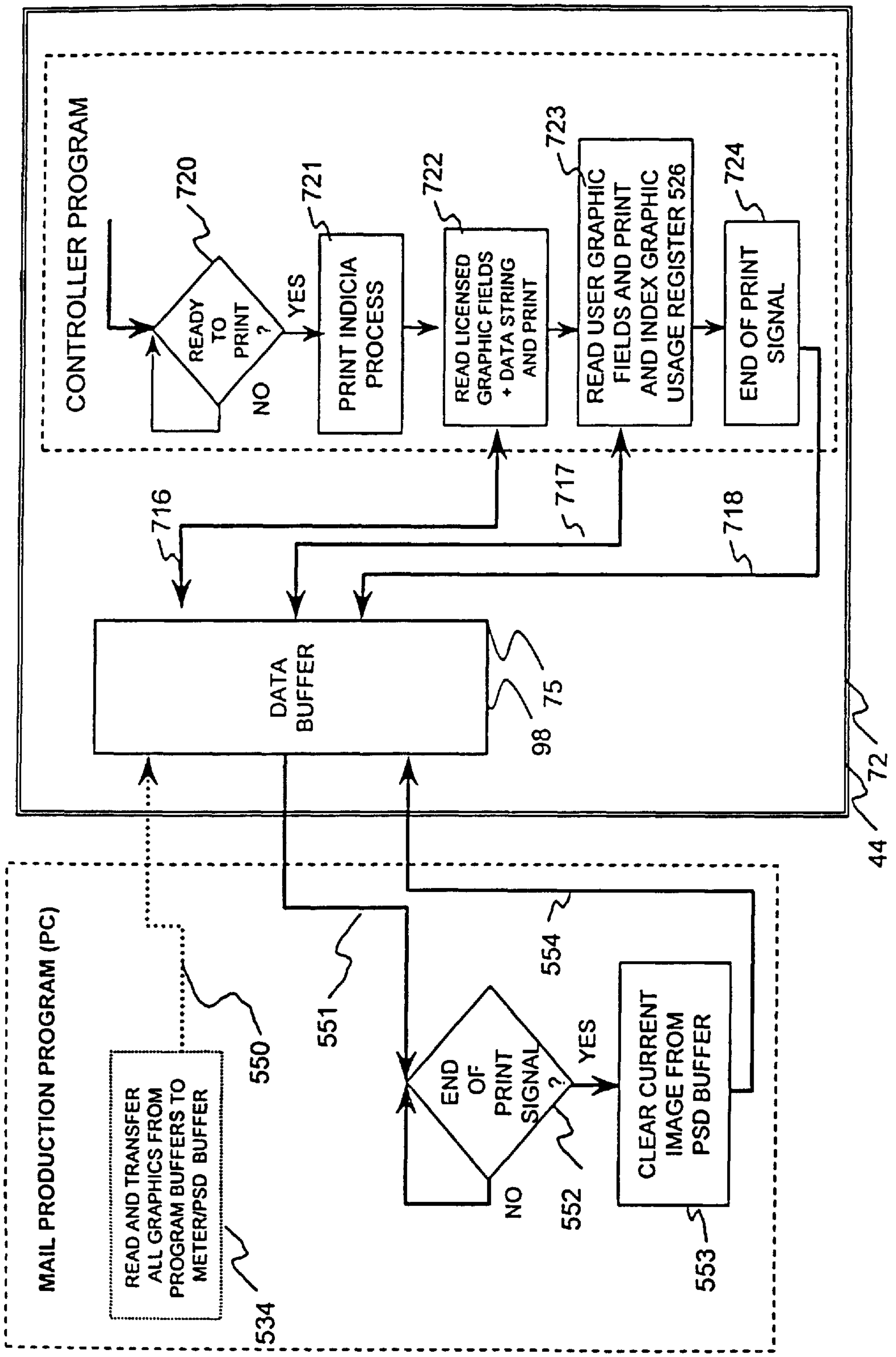
FIG. 9 is a flow chart that shows the interaction between the mail production software residing in computer 41 and computer 70 and the controller programs contained in PSD 44 and meter 72 leading to the printing of a licensed graphic indicia.

FIG. 9 is a flow chart that shows the interaction between the mail production software residing in computer 41 and computer 70 and the controller programs contained in PSD 44 and meter 72 leading to the printing of a licensed graphic indicia. The graphics from the buffers 526 and 528 to PSD buffer 98 or accounting and graphics 75 is read and transferred from block 534 via line 550. The output from block 553 is transmitted to PSD buffer 98 or ram card 79 via line 554. The output from PSD interface 98 or the output of accounting and graphics 75 is transmitted to the input of decision block 552 via line 551. Decision block 552 determines whether or not the end of print signal is present. If the end of print signal is not present, then the program goes back to the input of block 552. If block 552 decides that the end of print signal is present, then the program goes to block 553 to clear the current image from PSD 44. The foregoing clear signal is transmitted to PSD buffer 98 via line 554 or accounting and graphics 75 via line 554.

PSD controller program receives a print command from itself. This command is received when the controller determines that all the ready to print requirements are done. Decision block 720 receives at its input the print command. Decision block 720 determines whether or not computer 71 is ready to cause printer 42 to print (FIG. 4). If printer 42 or printer 76 is not ready to print, then the program goes back to the input of block 720. If block 720 decides that printer 42 or printer 76 is ready to print, then the program goes to block 721 to print the indicia. Then the program goes to block 722 to read the licensed graphic fields and print the information that is read in block 722. This information is transmitted from PSD 44 to block 722 via line 716 or accounting and graphics 75 via line 716. The information from block 722 is also transmitted back to PSD buffer 98 via line 716 or accounting and graphics 75 via line 716. Now the program goes to block 723 to read the non-licensed user graphics, print field and print and index the graphic register 526. The user graphics print field is transmitted from PSD buffer 98 to block 723 via line 717. Then the program goes to block 724 end of print signal from printer 42. The end of print signal is transmitted to PSD 44 via line 718 or accounting and graphics 75 via line 718 and the end of print signal to printer 42 and printer 76.

Figure 10A:
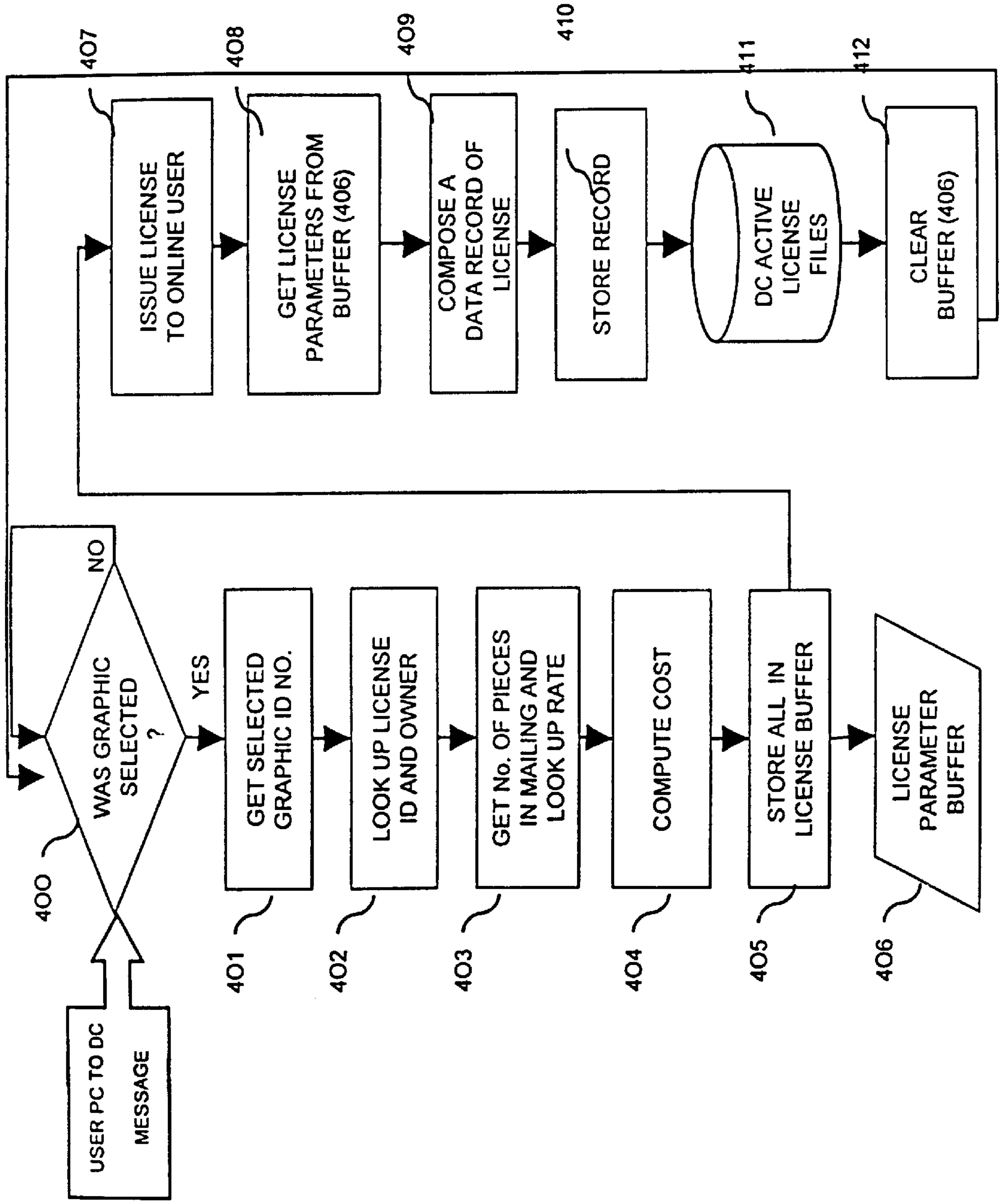
FIG. 10A is a flow chart showing how the user of computer 41 or computer 70 would obtain a license to reproduce a registered graphic.

FIG. 10A is a flow chart showing how the user of computer 41 or computer 70 would obtain a license to reproduce a registered graphic. The program begins when the user of computer 41 or computer 70 decides to communicate with data center computer 55 or data center computer 86. At this point the program goes to decision block 400. Decision block 400 determines whether or not a graphic was selected. If a graphic was not selected, the program goes back to the input of block 400. If a graphic was selected, the program goes to block 401 to obtain the selected graphic identification number. Then the program goes to block 402 to look up the next open license identification number and the owner of the selected graphic. Now the program goes to block 403 to obtain the number of pieces in the mailing and look up the rate for licensing the selected number of pieces. Then the program goes to block 404 where the cost of using graphic information 32 for the number of mail pieces requested is computed. Then the program goes to block 405 to store the above information in the license buffer 406.

Then the program goes to block 407, issue license to the online user. Now the program goes to block 408 to obtain the license parameters from buffer 406. Then the program goes to block 409 to compose a data record of the license agreement. At this point, the program goes to block 410 and stores the above record. Then the program goes to block 411, data center active license file. Now the program goes to block 412 and clears buffer 406. At this juncture, the program goes back to the input of block 400.

Figure 10B:
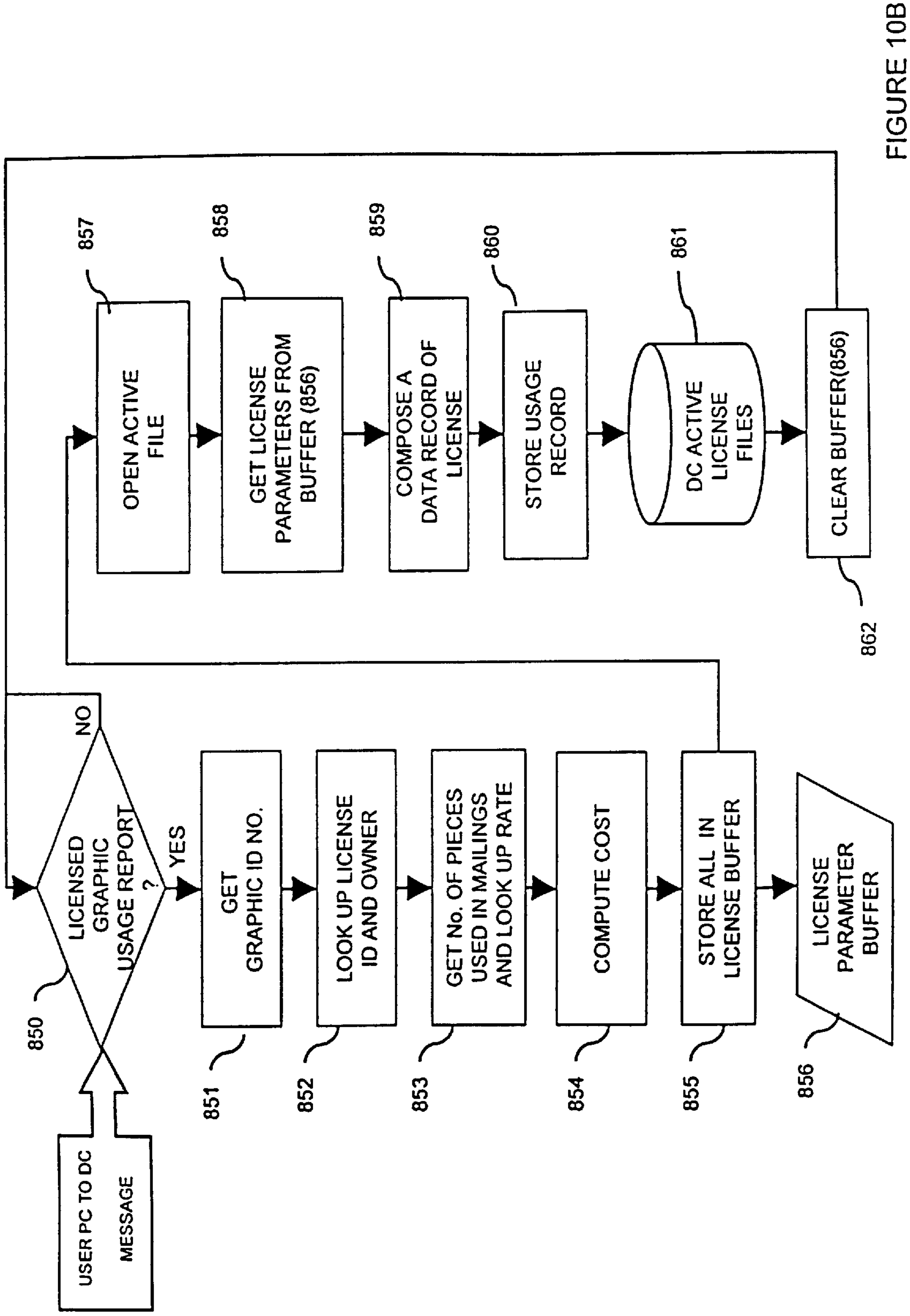
FIG. 10B is a flow chart showing how the user of computer 41 or computer 70 reports usage of graphic information to data center computer 55 or data center computer 86.

FIG. 10B is a flow chart showing how the user of computer 41 or computer 70 reports usage of graphic information to data center computer 55 or data center computer 86. At this point, the program goes to decision block 850. Decision block 850 determines whether or not a licensed graphic usage report was selected. If a graphic usage report was not selected, the program goes back to the input of block 850. If a graphic usage report was selected, the program goes to block 851 to obtain the graphic identification number. Then the program goes to block 852 to look up the license identification number and the owner of the owner of the graphic. Now the program goes to block 853 to obtain the number of pieces in the mailing and look up the rate for using the selected number of pieces. Then the program goes to block 854 where the cost of using graphic information 32 for the number of mail pieces requested is computed. Then the program goes to block 855 to store the above information in the license buffer 856.

Then the program goes to block 857 to open a active file. Now the program goes to block 858 to obtain the license parameters from the buffer of block 856. Then the program goes to block 859 to compose a data record of the license. At this point the program goes to block 860 and stores the usage record. Then the program goes to block 861, data center active license files. Now the program goes to block 862 and clears buffer 856. At this juncture, the program goes back to the input of block 850.

Figure 11:
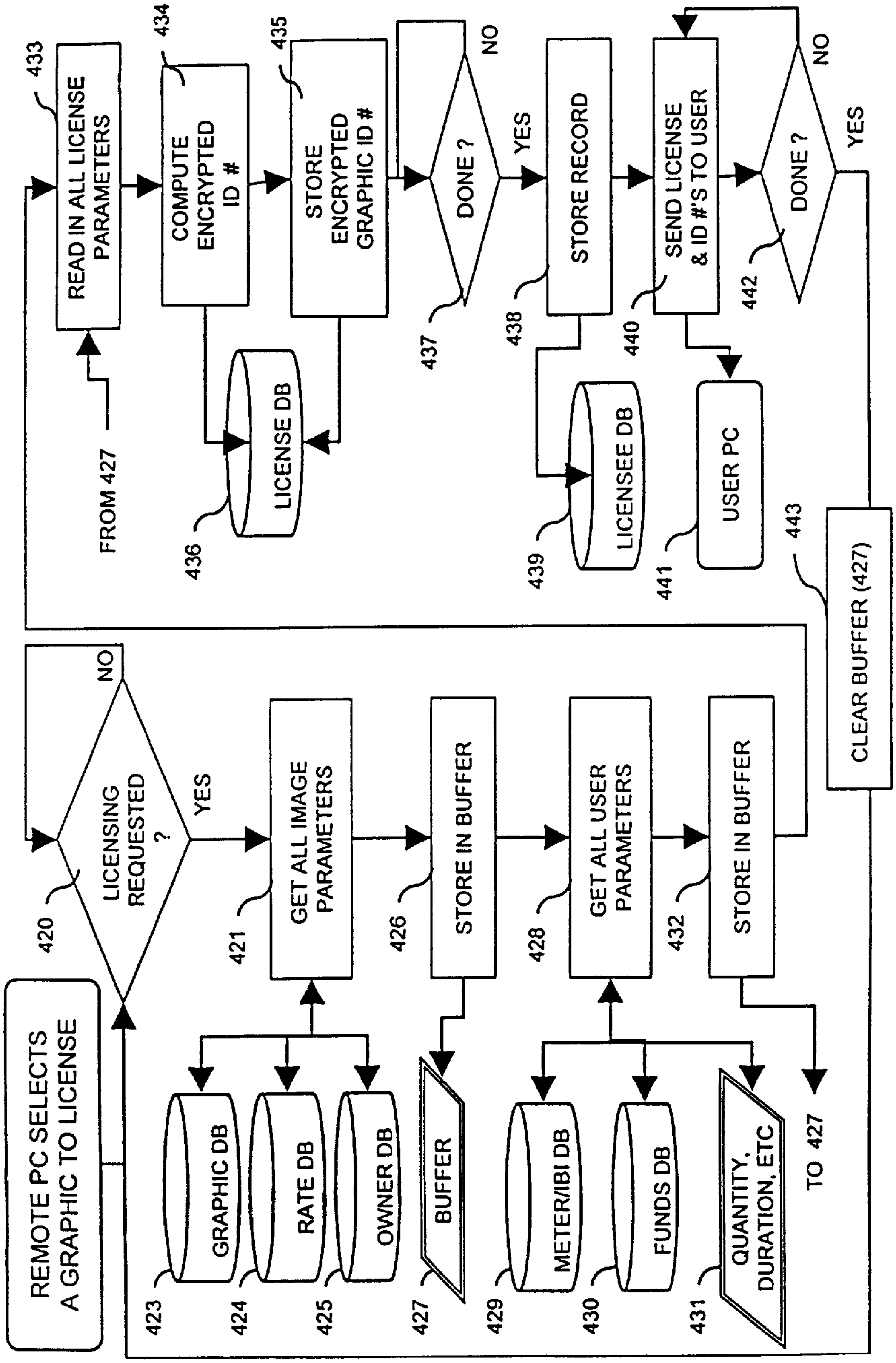
FIG. 11 is a flow chart showing how data center computer 55 or data center computer 86 processes a request for a graphic.

FIG. 11 is a flow chart showing how data center computer 55 or data center computer 86 processes a request for a graphic from a licensee. The program begins in decision block 420 when the user of computer 41 or computer 70 selects a graphic to license from the license entered into in FIG. 10. Decision block 420 determines whether or not any licensing was requested. If no licensing was requested, the program goes back to the input of block 420. If licensing was requested, then the program proceeds to block 421 to obtain all image parameters. Block 421 obtains the graphics database from block 423, the rate database from block 424, and the owner database from block 425. The above databases are sent to block 426 for storage in a buffer. Then the databases are stored in block 427, buffer 3. Now the program goes to block 428 to obtain all the user parameters. Block 428 obtains the meter or IBI database from block 429, the funds database from block 430 and the quantity, duration, etc. of the run from block 431. Then the program goes to block 432 to store the above information in buffer 427. Now the program goes to block 433 to read all the license parameters from block 427.

Then the program goes to block 434 to compute the encrypted graphic identification number, i.e., encrypted number 35. Encrypted number 35 may contain an indication that the mailer would like the post to track the arrival of the mail piece at specific post offices near the destination address of the mail piece. The manner in which encrypted number 35 is obtained is disclosed in the Sansone et al. U.S. Pat. No. 4,831,555 entitled "Unsecured Postage Applying System" herein incorporated by reference. It would be obvious to one skilled in the art that additional printed parameters or other parameters stored in the data bases or found on the mail piece may be used to obtain encrypted number 35. Then the program goes to block 435 to store the encrypted graphic identification number. The encrypted graphic identification number is stored in license database 436. Now the program goes to decision block 437. Block 437 determines whether or not the computed and stored encrypted graphic identification number has been completed. If block 437 determines that the number has not been stored, the program goes back to block 434 to compute and store a new encrypted graphic identification number. If block 437 determines that the encrypted graphic identification number has been computed, stored and encrypted, then the program goes to block 438 to store the record. The record is then stored in licensee database 439. Now the program goes to block 440 to send the license and identification numbers to the user. Then the program goes to block 441 to send these numbers to computer 41 or computer 70. At this point the program goes to decision block 442. Block 442 determines whether or not the license identification numbers have been sent to the user. If block 442 determines that the identification numbers have not been sent to the user, the program goes back to block 440. If block 442 determines that the identification numbers have been sent to the user, then the program goes to block 443 to clear buffer 427. At this point the program goes back to decision block 420.

Figure 12A:
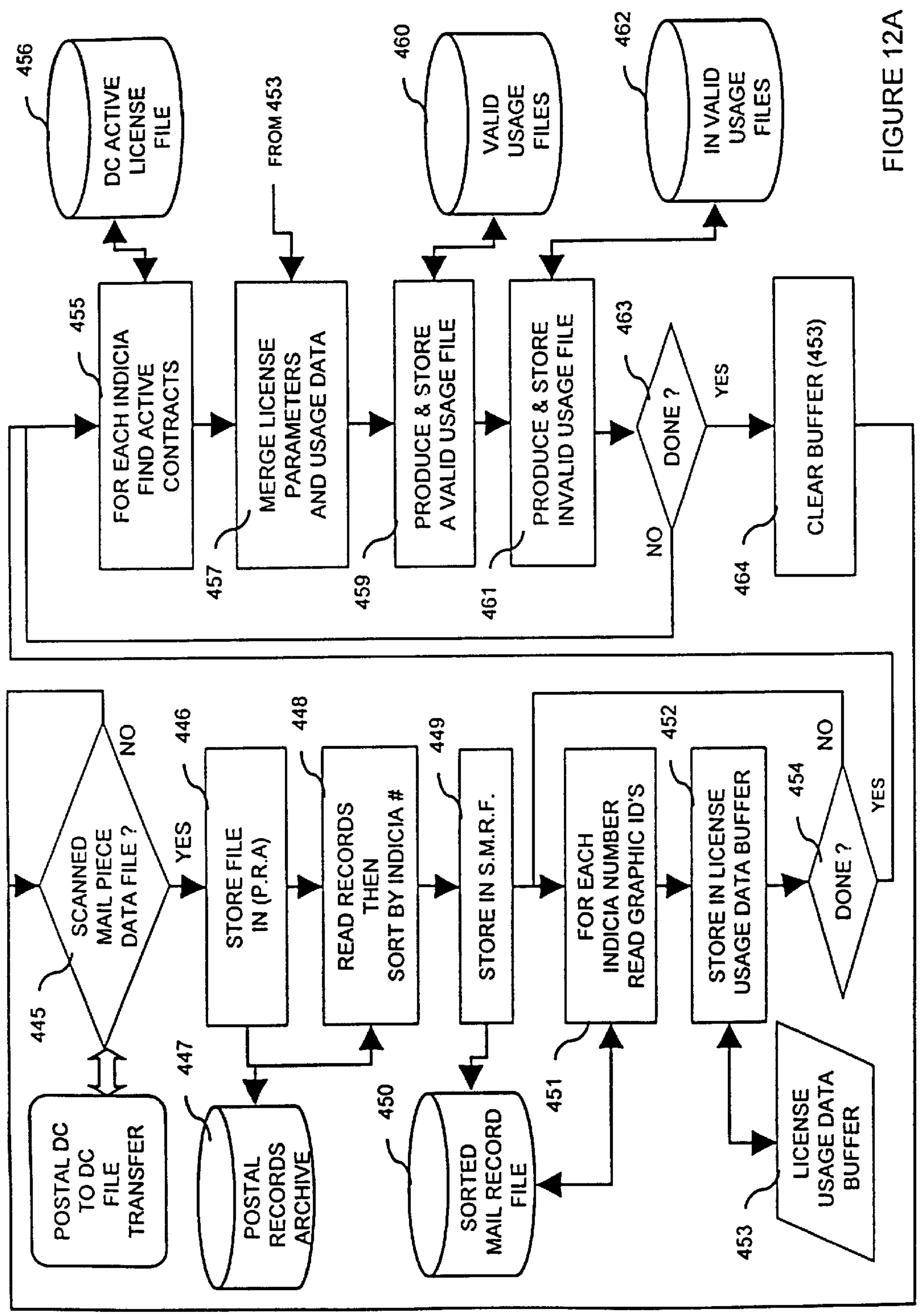
FIG. 12A is a flow chart showing how postal data center computer 61 or postal data center computer 95 sends processed scanned mail piece files to data center computer 55 or data center computer 86.

FIG. 12A is a flow chart showing how postal data center computer 61 or postal data center computer 95 sends processed scanned mail piece files to data center computer 55 or data center computer 86. The program begins in decision block 445. Block 445 determines whether or not a scanned mail piece data file is going to be transferred. If block 445 determines that a scanned mail piece data file is not going to be transferred, then the program goes back to the input of block 445. If block 445 determines that the scanned mail piece data file is going to be transferred, then the program goes to block 446 to store the file in postal records archives. Then the program goes to block 447 to store the scanned mail piece data file in postal records archive 447. Then the program goes to block 448 to read the records and then sort the records by indicia number. Then the program goes to block 449 to store the record in the sorted mail file record file block 450. Then the program goes to block 451 to read the graphic identification numbers for each sorted indicia number. Then the program goes to block 452 to store the graphic identification numbers in the license usage data buffer. This information also goes to block 453, the licensed usage data buffer.

Then the program goes to decision block 454. Decision block 454 determines whether or not the license information has all been stored in the usage data buffer 453. If block 454 determines that the usage data buffer has not stored all the information, then the program goes back to the input of block 451. If block 454 determines that the usage data buffer has stored the all the information, then the program goes to block 455. Block 455 finds the active license for each indicia. This information is transferred to block 456, the data center active license file. Then the program goes to block 457 to merge the license parameters and usage data that block 457 receives from block 453. Then the program goes to block 459 to produce and store the valid usage file. The valid usage file is stored in block 460. Then the program goes to block 461 to produce and store the invalid usage file. The invalid usage file is stored in block 462. Now the program proceeds to decision block 463. Decision block 463 determines whether or not the above files have been stored. If block 463 determines that the above files have not been stored, then the program goes back to the input of block 455. If block 463 determines that the above files have been stored, then the program goes back to the input of block 445.

Figure 12B:
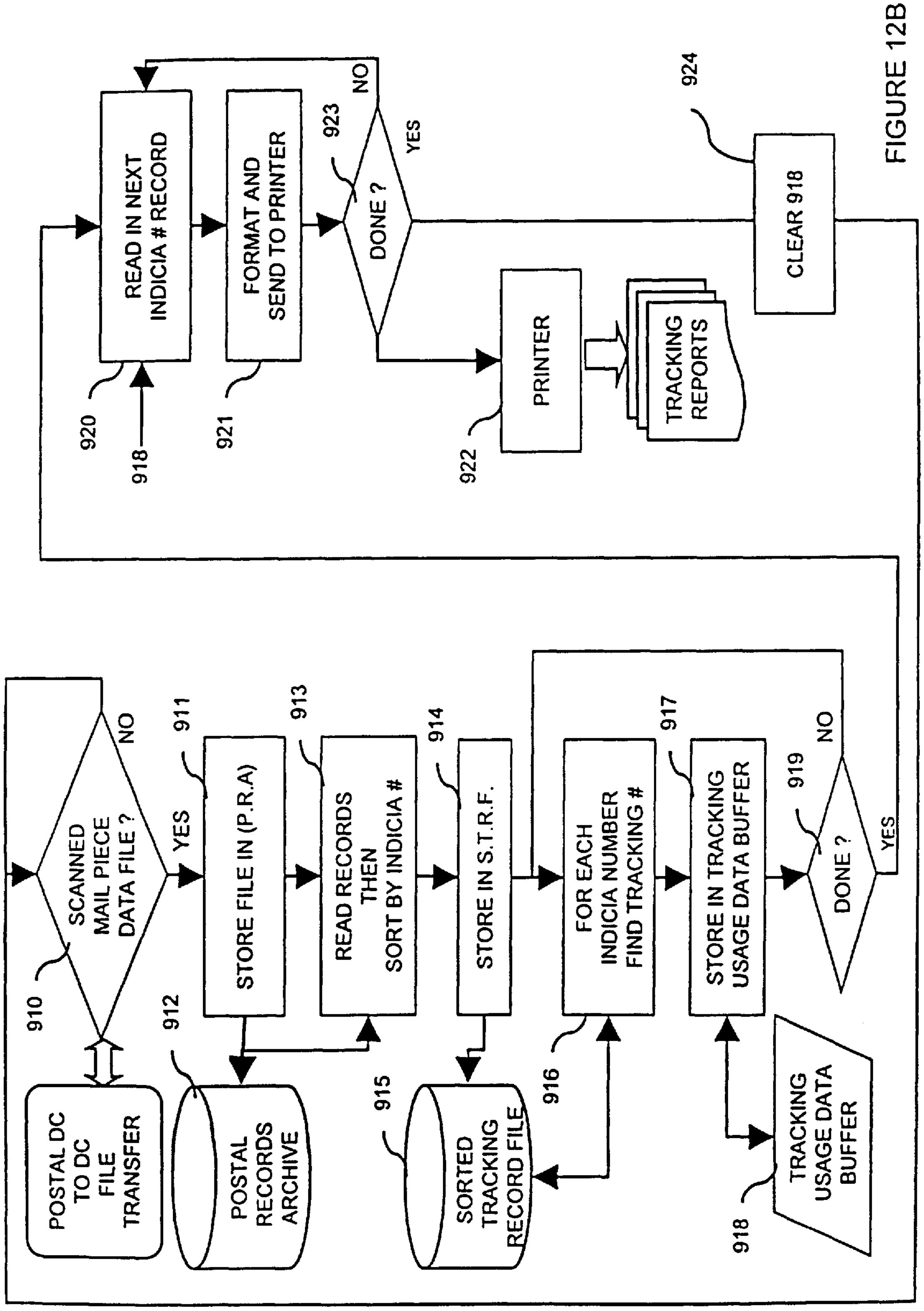
FIG. 12B is a flow chart showing the transfer of scanned mail piece records from the post office to the data center and the production of printed tracking reports.

FIG. 12B is a flow chart showing the transfer of scanned mail piece records from the post office to the data center and the production of printed tracking reports. The program begins in decision block 910. Block 910 determines whether or not the mail piece data file transferred from postal data center computer 61 has been scanned. If block 910 determines that the mail piece data file has not been scanned, the program goes back to the input of block 910. If block 910 determines that the mail piece data file has been scanned, the program goes to block 911. Block 911 stores the file in postal records archive block 912. Then the program goes to block 913 to read records and then sort the records by indicia number.

Now the program goes to block 914 store in sorted tracking record file. Then the program goes to block 915 sorted tracking record filed. Then the program goes to block 916 to find for each indicia number a tracking number. Then the program goes to block 917 to store the information in the tracking usage buffer. Then, contemporaneously, the program goes to block 918 tracking usage data and to decision block 919. Decision Block 919 determines whether or not all the tracking information has been stored. If block 919 determines that all the tracking information has not been stored, then the program goes back to the input of block 916. If block 919 determines that all the tracking information has been stored, then the program goes to the input of block 920 to read records from tracking usage data buffer 918.

Then the program goes to block 921 to format each record and send to printer block 922. Then a mailer tracking report is printed. Then the program goes to decision block 923. Block 923 determines whether one not each record has been printed and sent to printer block 922. If block 923 determines that each record has not been printed, the program goes back to block 921. If block 923 determines that each record has been printed, the program goes back to the input of block 910.

Figure 13:
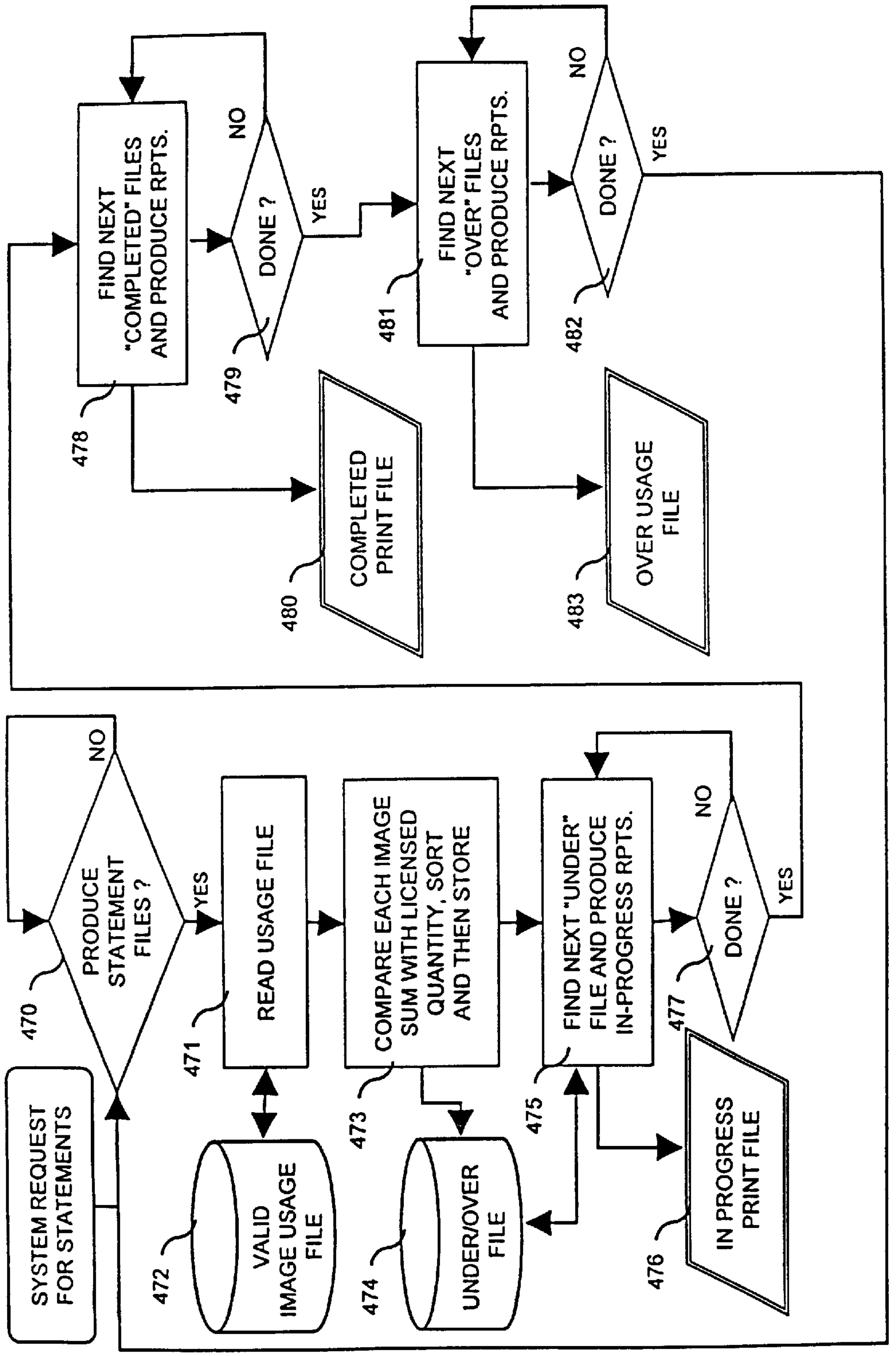
FIG. 13 is a flow chart showing how data center 55 or data center 86 produces sorted files.

FIG. 13 is a flow chart showing how data center 55 or data center 86 produces sorted files. The program begins in decision block 470. Decision block 470 determines whether or not to produce statement files. If block 470 determines not to produce statement files, then the program goes back to the input of block 470. If block 470 determines to produce statement files, then the program goes to block 471 to read the usage file. Block 471 reads the valid image usage file from block 472. Then the program goes to block 473 to compare each image sum with the licensed quantity and sorts and then stores this sum. The sum is stored in the under/over file 474. Then the program goes to block 475 to find the next under file and produce an in progress report. Block 475 receives information from block 474.

Then the program goes to block 476, the in progress print file. Then the program goes block to block 477. Decision block 477 determines whether or not the in progress reports have been completed. If block 477 determines that the in progress reports have not been completed, then the program goes back to the input of block 475. If block 477 determines that the in progress reports have been completed, then the program goes to block 478 to find the next completed files and produce reports. Then the program goes to block 480 to complete the print file. Then the program goes to block 479. Decision block 479 determines whether or not the report has been produced. If block 479 determines that the report has not been produced, then the program goes back to block 478. If block 479 determines that the report has been produced, the program goes to block 481 to find the next over files and produce reports. Then the program goes to block 483 to over print file. Now the program goes to decision block 482. Block 482 determines whether or not the over files have been produced. If block 482 determines that the over files have not been produced, then the program goes back to block 481. If block 482 determines that the over files have been produced, then the program goes back to the input of block 470.

Figure 14:
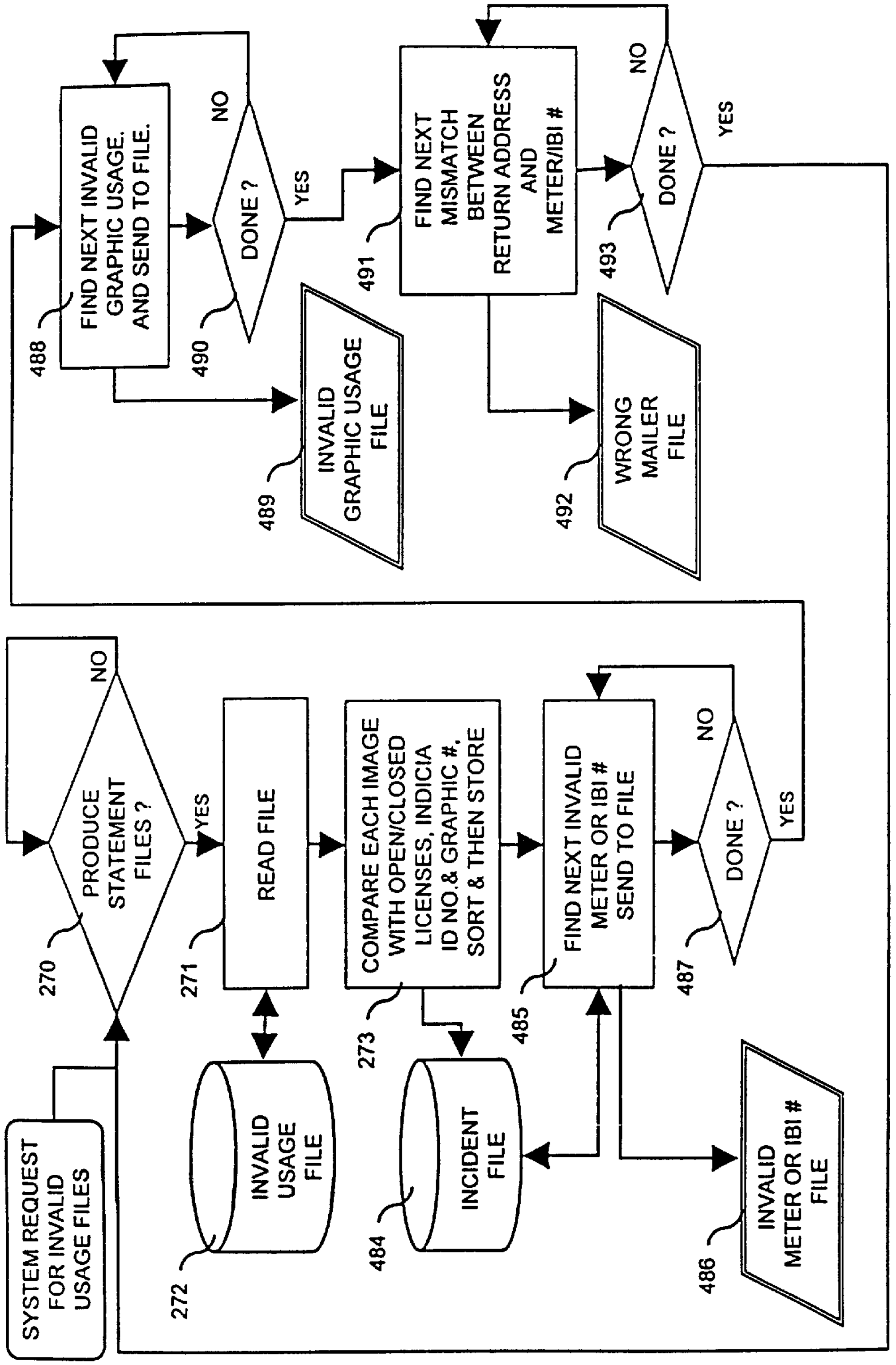
FIG. 14 is a flow chart showing how data center 55 or data center 86 produces invalid usage reports.

FIG. 14 is a flow chart showing how data center 55 or data center 86 produces invalid usage reports. The program begins in decision block 480. Decision block 270 determines whether or not to produce statement files. If block 270 determines not to produce statement files, then the program goes back to the input of block 270. If block 270 determines to produce statement files, then the program goes to block 271 to read the file. The file is read from invalid image usage file 272. Then the program goes to block 273 to compare each image with open/closed licenses indicia identification numbers and graphic numbers and to sort and then store them in block 273. The incident files are then stored in block 484. Now the program goes to block 485 to find the next invalid meter or IBI number and send this to file. Then the program goes to block 486, the invalid meter or IBI file.

Then the program goes to decision block 487. Block 487 determines whether or not the next invalid meter or IBI number has been sent to the file. If block 487 determines that the number has not been sent to file, then the program goes back to the input of block 485. If block 487 determines that the next invalid meter or IBI number file has been sent to file, then the program goes to block 488 to find the next invalid graphic usage and send this to file. Now the program goes to block 489, the invalid graphic usage file. Then the program goes to decision block 490. Block 490 determines whether or not the above process has been completed. If the above process has not been completed, then the program goes back to the input of block 488. If block 490 determines that the above process has been completed, then the program goes to block 491 to find the next mismatch between the return address and the meter/IBI numbers. Then the program goes to block 492 and puts this information in the wrong mailer file. Then the program goes to decision block 493. Block 493 determines whether or not this process has been completed. If the process has not been completed, then the program goes back to the input of block 491. If the process has been completed, then the program goes to the input of block 270.

Figure 15:
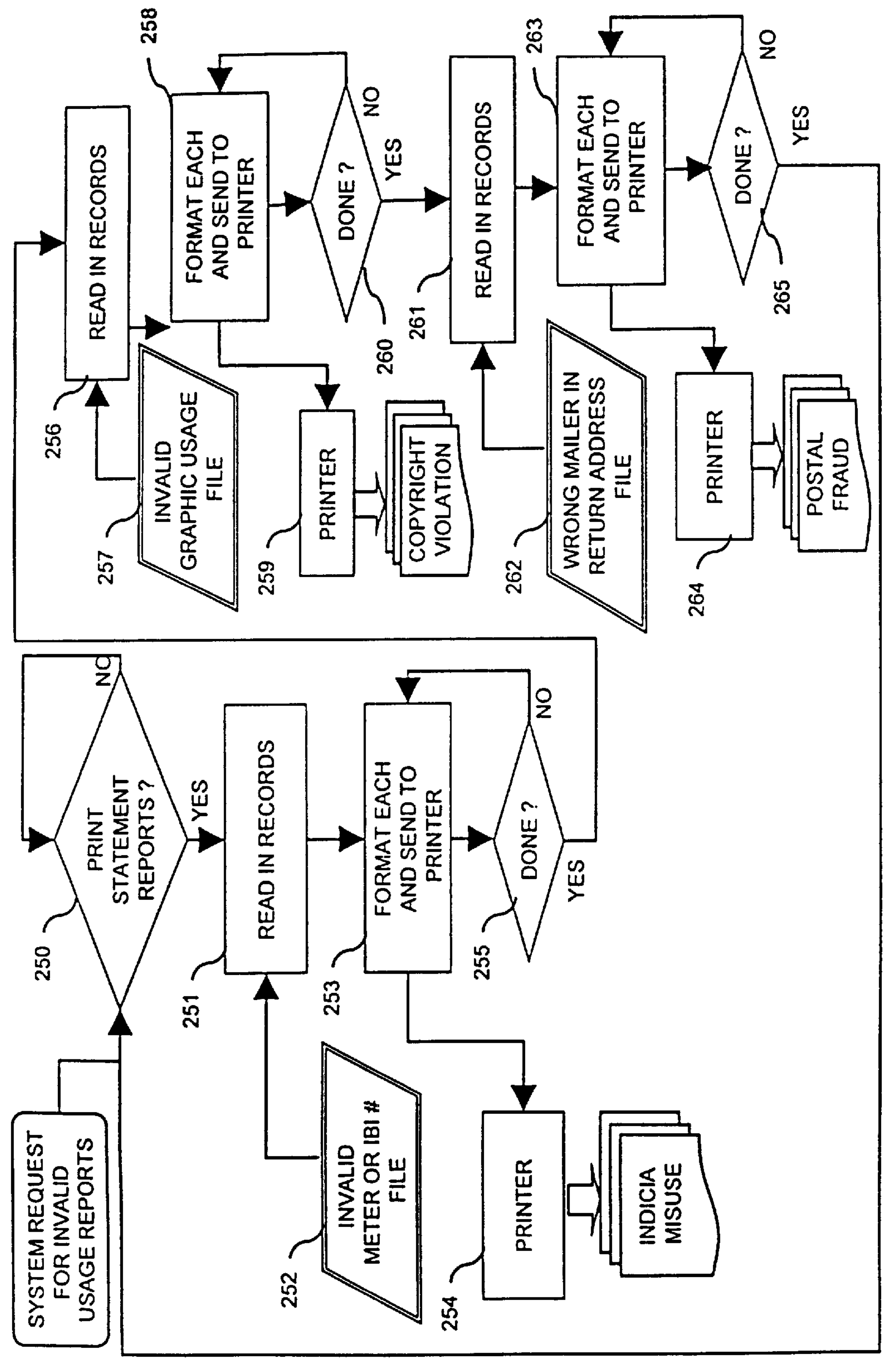
FIG. 15 is a flow chart showing how data center 55 or data center 86 produces copyright, postal fraud and indicia misuse reports.

FIG. 15 is a flow chart showing how data center 55 or data center 86 produces copyright violation, postal fraud and indicia misuse reports. The program begins in decision block 250. Decision block 250 determines whether or not to print statement reports. If block 250 determines not to produce statement reports, then the program goes back to the input of 250. If block 250 determines to print statement reports, then the program goes to block 251 to read in records of invalid meter or invalid IBI files. Then records are read into block 251 from block 252, invalid meter or IBI number file. Then the program goes to block 253 to format each file and send the file to a printer. Then the program goes to block 254 to print the indicia misuse records.

Now the program goes to decision block 255. Decision block 255 determines whether or not the printing has been completed. If block 255 determines that the printing has not been completed, then the program goes back to the input of block 253. If block 255 determines that the printing has been completed, then the program goes to block 256 to read in records. Block 256 reads in invalid graphic usage file records from block 257. Then the program goes to block 258 to format each record and send them to a printer. Then the program goes to block 259 to print the copyright violation report. Now the program goes to decision block 260. Block 260 determines whether or not the copyright violation report has been printed. If block 260 determines that the copyright violation report has not been printed, then the program goes back to block 258. If block 260 determines that the copyright violation report has been printed, then the program goes to block 261 to read in records. Then the wrong mailer in return address field file records from block 262 are read into block 261. Then the program goes to block 263 to format each record and send them to a printer. Now the information is sent to printer block 264 to print the postal fraud report. Then the program goes to block 265 to determine whether or not the postal fraud report has been completed. If block 265 determines that the postal fraud report has not been completed, then the program goes back to the input of block 263. If block 265 determines that the postal fraud report has been completed, then the program goes back to the input of block 250.

Figure 16:
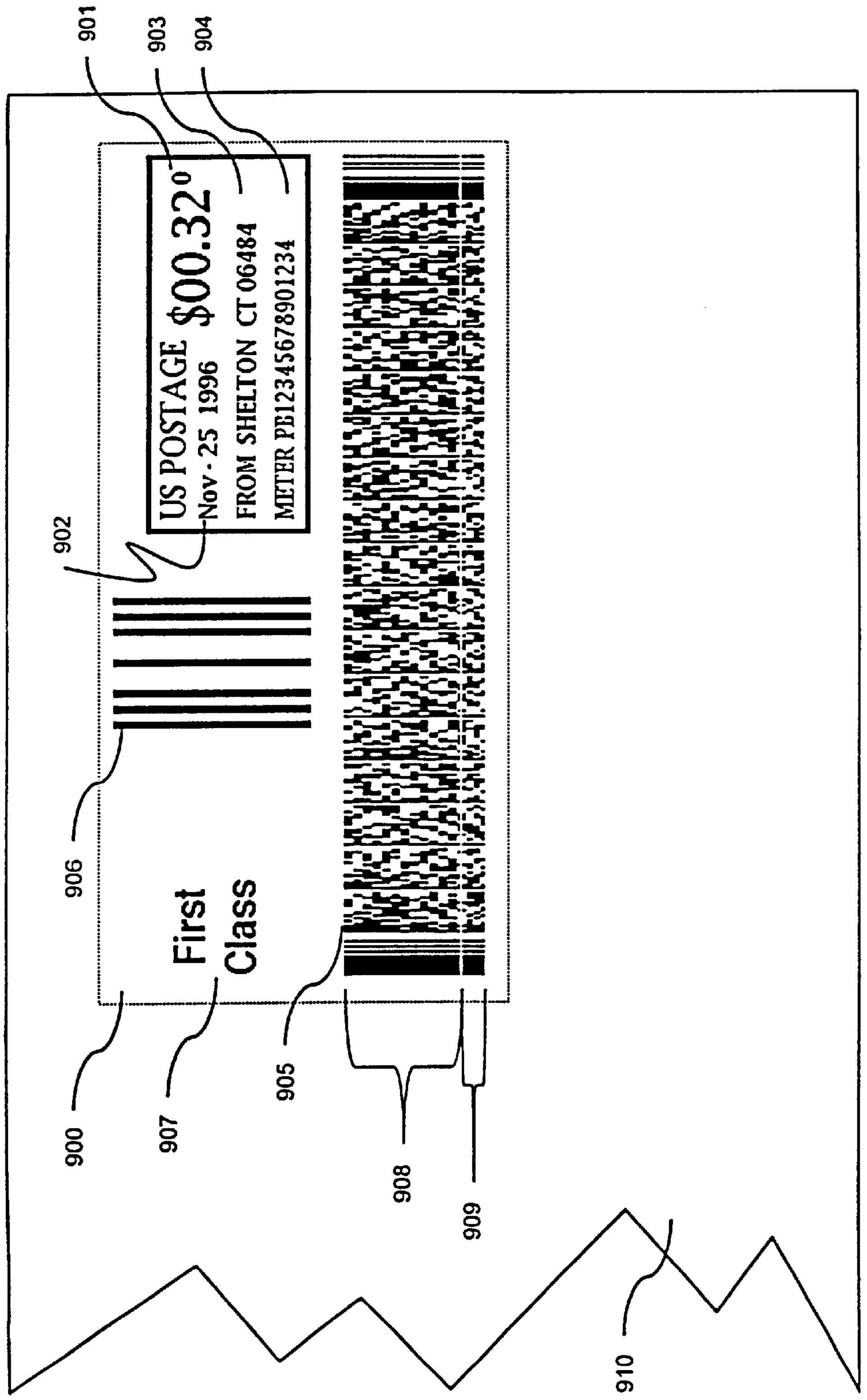
FIG. 16 is a drawing showing encrypted number 35 hidden in an Information-Based Indicia.

FIG. 16 is a drawing showing encrypted number 35 hidden in an Information-Based Indicia. Indicia 900 contains a dollar amount 901, the date 902 that postal indicia 900 was affixed to a mail piece 910, the place 903 that the mail piece was mailed, the postal meter serial number 904, a two-dimensional encrypted bar code 905, a FIM 906 and the class of mail 907. Information-Based Indicia data elements 1–11 are contained in space 908. Data element No. 1 is the meter or PSD identification number and data element No. 2 is the ascending register value of the meter or PSD. Data element No. 3 is the postage for this particular mail piece and data element No. 4 is the digital signature. Data element No. 5 is the mailing date of mail piece 910 and data element No. 6 is the originated address of the mail piece. The address is obtained from the human readable text field on the mail piece. Data element number 7 is the license zip code and data element number 8 is the software identification number of the PSD. Data element No. 9 is the descending register value and data element No. 10 is the PSD certificate identification. Data element No. 11 is the rate category for the mail piece 910 being mailed.

Information-Based Indicia data element No. 12 is contained in space 909. Data element No. 12 has been reserved by the United States Postal Service. Space 909 contains encrypted number 35.

Figure 17:
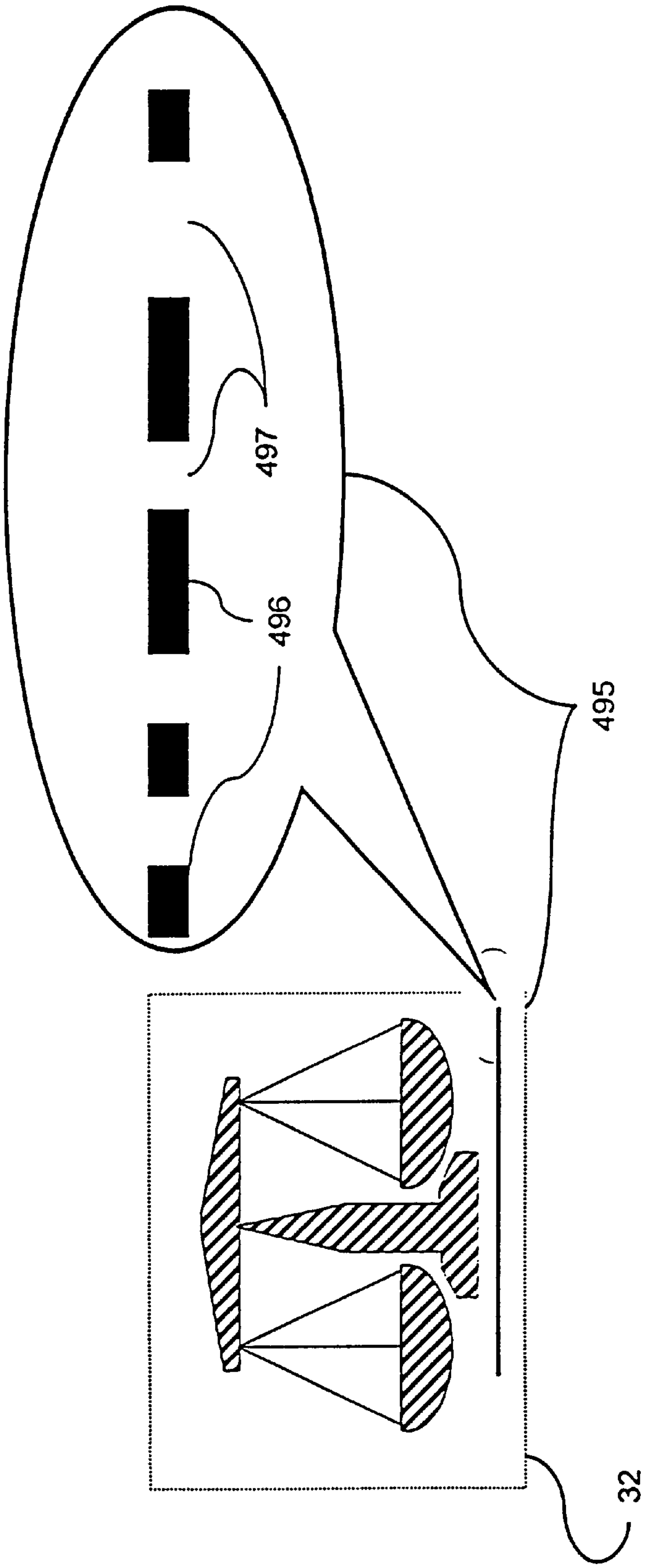
FIG. 17 is a drawing showing how encrypted number 35 (not shown) is hidden in graphic information 32.

FIG. 17 is a drawing showing how encrypted number 35 (not shown) is hidden in graphic information 32. Graphic information 32 may be composed of many lines that are similar to line 495. Encrypted number 35 may be hidden within any line 495 of graphic information 32. This may be done by having a binary code equivalent or other coded equivalent of encrypted number 35 placed within line 495. Zeroes will be shown by spaces 496 and ones may be shown by spaces 497. It will be obvious to one skilled in the art that encrypted number 35 may be hidden in other areas of graphic information 32.

The above specification describes a new and improved system and method for recording tracking, graphical and/or textual information on a mailpiece. It is realized that the above description may indicate to those skilled in the art additional ways in which the principles of this invention may be used without departing from the spirit. It is, therefore, intended that this invention be limited only by the scope of the appended claims.

What is claimed is:

1. A system for monitoring a mailpiece, comprising:

means for scanning the mailpiece for the presence of an identifier uniquely identifying artistic or graphic material that is contracted to be printed on the mailpiece;

means for counting the number of times the unique identifier is read; and means for reporting the number of times the identifier is read.

2. The system claimed in claim 1, wherein the owner of the artistic or graphic material contracts with a party for the artistic or graphic material to be reproduced a specified number of times.

3. The system claimed in claim 1, wherein the unique identifier contains tracking information that is used to track the location of the mailpiece.

4. The system claimed in claim 3, further including:

a data center that receives information from the means for reporting and receives information regarding the number of times the artistic or graphic material was contracted to be reproduced.

5. The system claimed in claim 4, wherein the data center compares the number of times the unique identifier was read with the number of times the artistic or graphic material was contracted to be reproduced to determine if misuse has been committed in the production of the artistic or graphic material.

6. The system claimed in claim 3, further including means for generating a report detailing the arrival times and location of the mailpiece.

* * * * *